US007730490B2

(12) United States Patent
Ito

(10) Patent No.: US 7,730,490 B2
(45) Date of Patent: Jun. 1, 2010

(54) SYSTEM WITH USER ACCESS-CONTROL INFORMATION HAVING SIGNATURE AND FLOW SETTING INFORMATION FOR CONTROLLING ORDER OF PERFORMANCE OF FUNCTIONS

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 11/844,165

(22) Filed: Aug. 23, 2007

(65) Prior Publication Data

US 2008/0059962 A1 Mar. 6, 2008

(30) Foreign Application Priority Data

Aug. 24, 2006 (JP) ............................... 2006-227987

(51) Int. Cl.
*G06F 9/46* (2006.01)
*G06F 15/16* (2006.01)
*G06F 3/12* (2006.01)
*G06F 17/00* (2006.01)
*G06F 7/04* (2006.01)
*H04L 9/32* (2006.01)

(52) U.S. Cl. ........................... 718/106; 718/102; 726/1; 726/2; 726/4; 713/175; 713/176; 709/229; 358/1.1; 358/1.15

(58) Field of Classification Search ................. 718/102, 718/106; 726/1, 2, 4; 713/175–176; 709/229; 358/1.1, 1.15

See application file for complete search history.

(56) References Cited

U.S. PATENT DOCUMENTS

| | | | | |
|---|---|---|---|---|
| 5,710,921 A * | 1/1998 | Hirose | ........................ | 718/106 |
| 5,784,664 A * | 7/1998 | Nakamura et al. | ............. | 399/8 |
| 6,385,728 B1 * | 5/2002 | DeBry | ............................ | 726/9 |
| 6,954,901 B1 * | 10/2005 | Desai et al. | .................. | 715/745 |
| 7,130,066 B1 | 10/2006 | Kanematsu | | |
| 7,552,335 B2 * | 6/2009 | Iwamura | ...................... | 713/176 |
| 2002/0194245 A1 | 12/2002 | Simpson et al. | | |
| 2004/0107348 A1 * | 6/2004 | Iwamura | ...................... | 713/176 |
| 2004/0194108 A1 | 9/2004 | Masui et al. | | |
| 2004/0199399 A1 | 10/2004 | Sugiyama | | |
| 2005/0146755 A1 * | 7/2005 | Shimokawa et al. | ......... | 358/453 |
| 2005/0166184 A1 | 7/2005 | Takao | | |
| 2006/0136992 A1 * | 6/2006 | Shigeeda | ........................ | 726/2 |
| 2007/0124516 A1 * | 5/2007 | Ohara et al. | ................... | 710/62 |
| 2008/0259384 A1 * | 10/2008 | Ito | ............................ | 358/1.15 |

(Continued)

FOREIGN PATENT DOCUMENTS

JP     2000-83232 A     3/2000

(Continued)

*Primary Examiner*—Meng-Ai An
*Assistant Examiner*—Jennifer N To
(74) *Attorney, Agent, or Firm*—Canon U.S.A., Inc., IP Division

(57) ABSTRACT

An image-forming apparatus configured to be controlled based on access-control information and to perform a flow which includes performance a plurality of functions of the image forming apparatus based on flow setting information, where flow setting information designates an order of performance of the plurality of functions of the image forming apparatus. The image-forming apparatus includes an acquisition unit configured to acquire the access-control information based on a signature included in the flow setting information if the flow setting information includes the signature, and a flow-performing unit configured to perform the flow based on the access-control information acquired by the acquisition unit.

12 Claims, 17 Drawing Sheets

U.S. PATENT DOCUMENTS

2009/0027724 A1 * 1/2009 Nagase et al. .............. 358/1.15

FOREIGN PATENT DOCUMENTS

| | | |
|---|---|---|
| JP | 2002-323967 A | 11/2002 |
| JP | 2004-288112 A | 10/2004 |
| JP | 2005-196414 A | 7/2005 |
| JP | 2005-301602 A | 10/2005 |
| JP | 2006-5910 A | 1/2006 |
| JP | 2006-224550 A | 8/2006 |
| JP | 2006-270632 A | 10/2006 |

* cited by examiner

FIG.6

| | SCAN | PRINT | | FAX | SEND | |
| --- | --- | --- | --- | --- | --- | --- |
| | | COLOR SETTING | IMPOSITION | | E-mail | FTP |
| | 601 | 602 | 603 | 604 | 605 | 606 |
| User A | OK | COLOR | — | OK | OK | OK |
| User B | OK | MONOCHROMATIC | COMPULSORY TWO-SIDED | NG | NG | NG |
| User C | NG | MONOCHROMATIC | COMPULSORY TWO-SIDED | OK | NG | NG |
| ... | | | | | | |

FIG.16

| | SCAN | PRINT | | SEND | | | FLOW |
| --- | --- | --- | --- | --- | --- | --- | --- |
| | | COLOR SETTING | IMPOSITION | FAX | E-mail | FTP | |
| User A | OK | COLOR | — | OK | OK | OK | 1234, 5678,.... |
| User B | OK | MONOCHROMATIC | COMPULSORY TWO-SIDED | OK | NG | NG | 5678,.... |
| User C | NG | MONOCHROMATIC | COMPULSORY TWO-SIDED | NG | NG | NG | — |
| ⋮ | | | | | | | |

1601 (FLOW column callout)

SYSTEM WITH USER ACCESS-CONTROL INFORMATION HAVING SIGNATURE AND FLOW SETTING INFORMATION FOR CONTROLLING ORDER OF PERFORMANCE OF FUNCTIONS

BACKGROUND OF THE INVENTION

1. Field of the Invention

The present invention relates to an image-forming apparatus having a plurality of functions, a control server, and an image-forming system. More specifically, the present invention relates to an image-forming apparatus, a control server, and an image-forming system configured to perform a plurality of functions of the image-forming apparatus as a series of flows.

2. Description of the Related Art

A conventional document-management system controls an access to a document. For example, such a conventional document-management system holds an access-control list (ACL) for each document or each document group including an aggregate of a plurality of documents. Furthermore, a conventional document-management system uses the ACL to manage a security rule as to what operation is permitted for each user.

In addition, a conventional document-management system has been developed that holds access information previously describing information as to what operation is permitted (or inhibited) for each user utilizing a function of an image-forming apparatus on a system. The access information is centrally managed by a security server to control user performance of processing.

Japanese Patent Application Laid-Open No. 2005-301602 discusses a document-management system that controls a user authority for performing an operation for managing a document, using a regulation previously defining whether a user is permitted to perform the operation, according to a type of a document the user desires to operate and previously held user information about the user desiring to operate the document.

Japanese Patent Application Laid-Open No. 2005-196414 discusses a method that utilizes a workflow for performing, in the case of performing a series of operations for capturing, processing, and outputting (distributing) a document file with an image-forming apparatus, a series of operations from capturing an image of a document to outputting (distributing) the read document having been processed, in a predetermined order. Such a conventional method registers a routine work, such as acknowledgement and circulation, which is frequently performed in the office, as a workflow. Thus, a user operation can be efficiently performed.

However, the conventional method does not control user performance of a flow by using access-control information for controlling performing a function of an image-forming apparatus when a user desires to perform the flow.

SUMMARY OF THE INVENTION

The present invention is directed to an image-forming apparatus and an image-forming system configured to control performance of a flow using access-control information when a user desires to perform the flow.

According to an aspect of the present invention, an image-forming apparatus is configured to be controlled based on access-control information and to perform a flow which includes performing a plurality of functions of the image forming apparatus based on flow setting information which designates an order of performance of the plurality of functions of the image forming apparatus. The image-forming apparatus includes an acquisition unit configured to acquire the access-control information based on a signature included in the flow setting information if the flow setting information includes the signature, and a flow-performing unit configured to perform the flow based on the access-control information acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 6 illustrates exemplary access-control information according to the first exemplary embodiment and the second exemplary embodiment of the present invention.

FIG. 16 illustrates exemplary access-control information according to the third exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
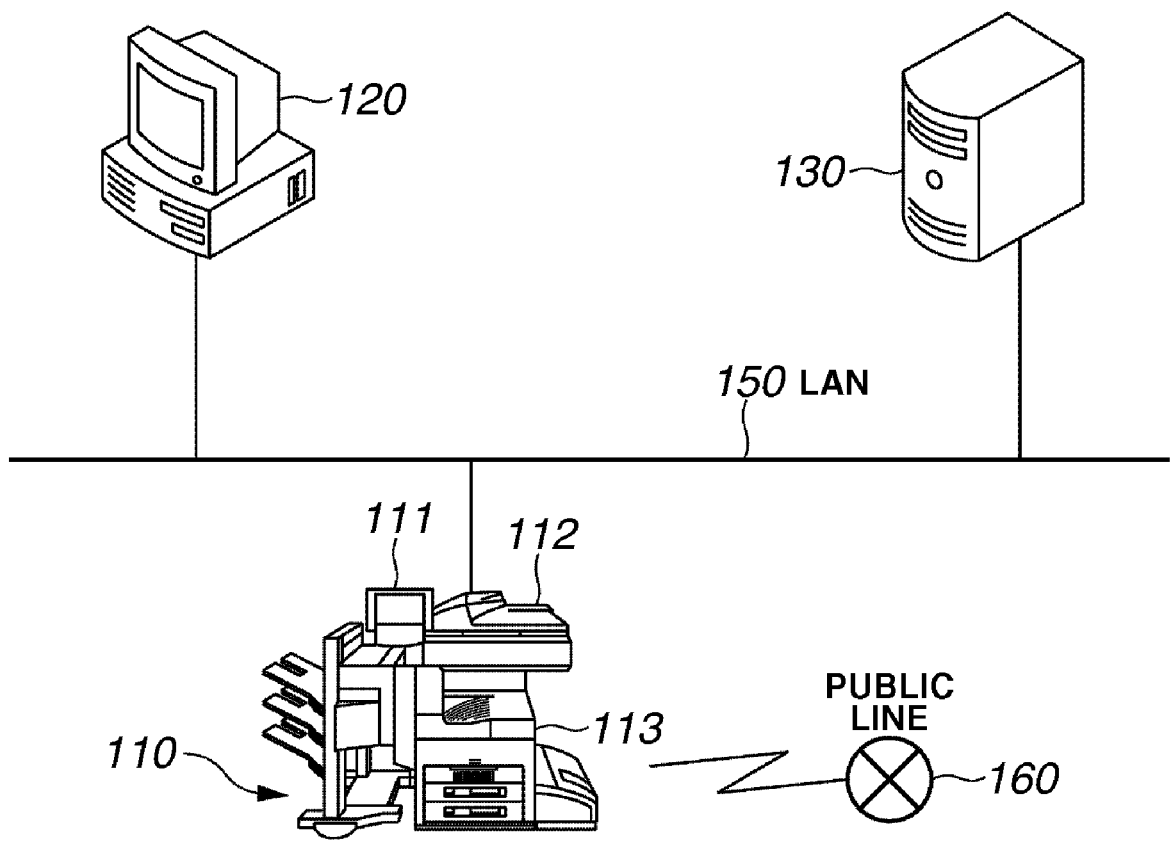
FIG. 1 illustrates an exemplary configuration of an image-forming system according to a first exemplary embodiment of the present invention.

Now, a first exemplary embodiment of the present invention will be described below. FIG. 1 illustrates an exemplary configuration of an image-forming system including an image-forming apparatus according to the first embodiment of the present invention. In the present embodiment, a copying machine, a printer, or a multifunction peripheral (MFP) can be used as an image-forming apparatus having a function to be described in detail later below.

Referring to FIG. 1, an image-forming apparatus 110 is in communication with a client computer (hereinafter referred to as a "client") 120 and a server computer (hereinafter referred to as a "server") 130 via a local area network (LAN) 150. The LAN 150 includes an Ethernet®. The image-forming apparatus 110 is connected to a public line 160.

In the image-forming system according to the present exemplary embodiment of the present invention, other apparatuses can be in communication with the image-forming system. In addition, in the present exemplary embodiment, a LAN is used as a communication method. However, the present invention is not limited to this. For example, an arbitrary network, such as a wide area network (WAN) (public line), a serial transmission method such as a universal serial bus (USB), or a parallel transmission method such as Centronics or a small computer systems interface (SCSI), can be used.

The image-forming apparatus 110 has a copy function and a facsimile function. Furthermore, the image-forming apparatus 110 has a data-transmission function for reading an image of a document and transmitting the obtained image data to each apparatus in communication with the image-forming apparatus 110 via the LAN 150.

In addition, the image-forming apparatus 110 has a function for interpreting a page description language (PDL). With the PDL interpretation function, the image-forming apparatus 110 can receive PDL data from a computer connected to the LAN 150 and print the received PDL data.

Furthermore, the image-forming apparatus 110 can store an image read with a scanner unit 112, or PDL data from a computer, in a specific area of a hard disk drive 204 (FIG. 2) installed in the image-forming apparatus 110. Hereinbelow, the specific area is referred to as a "box area".

In addition, the image-forming apparatus 110 can store a read image of a document in the box area as a digital image. Furthermore, the image-forming apparatus 110 can print the digital image stored in the box area.

The image-forming apparatus 110 includes the scanner unit 112 as an image input device, a printer unit 113 as an image output device, and a controller (control unit) 200 (FIG. 2) that controls the entire image-forming apparatus 110.

The scanner unit 112 converts image information into an electrical signal by inputting reflection light obtained by exposing and scanning an image of a document into a charge-coupled device (CCD). Furthermore, the scanner unit 112 converts the electrical signal into luminance signals for each color of red (R), green (G), and blue (B) and outputs the generated luminance signal to the controller 200 as image data.

In the present exemplary embodiment, a document is set on a document feeder. When a user generates an instruction for starting reading a document via an operation unit 111, the controller 200 generates an instruction for reading the document to the scanner unit 112. The scanner unit 112, having received the instruction from the controller 200, feeds documents stacked on the document feeder sheet by sheet and reads the fed document.

The method for reading a document is not limited to an automatic feeding method using the document feeder. That is, a document placed on a glass plate (not illustrated) can be scanned by moving an exposure unit.

The printer unit 113 is an image-forming device that forms an image on a printing sheet according to image data received from the controller 200.

In the present exemplary embodiment, an electrophotographic method using a photosensitive drum and a photosensitive belt is used as the method for forming an image. However, the present invention is not limited to this. For example, an inkjet image-forming method, in which ink is ejected from a minute nozzle array to print image data on a sheet, can be used.

The server 130 executes an operating system (OS) and various application programs with a central processing unit (CPU) and performs various data processing by executing an application under management by the OS. Similarly, the client 120 performs various data processing. The operations of the server 130 and the client 120 will be described in detail later below.

Figure 2:
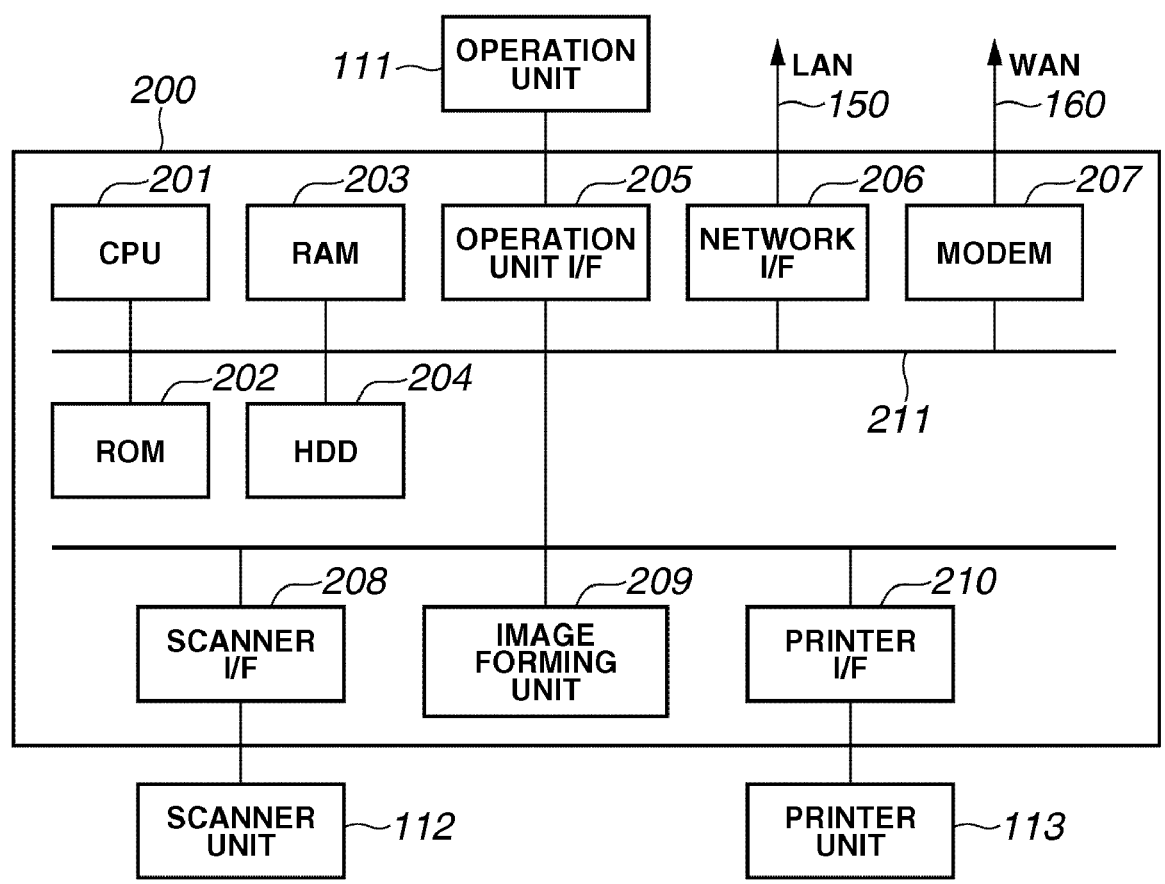
FIG. 2 illustrates an exemplary configuration of an image-forming apparatus according to the first exemplary embodiment of the present invention.

FIG. 2 illustrates an exemplary configuration of the controller 200 of the image-forming apparatus 110 according to the present exemplary embodiment.

Referring to FIG. 2, the controller 200 is electrically connected with the scanner unit 112 and the printer unit 113. Furthermore, the controller 200 is in communication with the client 120 and the server 130 via the LAN 150 or the WAN 160. Thus, image data can be input to the controller 200 of the image-forming apparatus 110, and the image-forming apparatus 110 can transmit image data and device information to other apparatuses connected via the LAN 150 or the WAN 160.

A CPU 201 controls an access to each connected device according to a control program stored on a read-only memory (ROM) 202. Furthermore, the CPU 201 controls various processing internally performed in the controller 200.

The ROM 202 stores a boot program of the image-forming apparatus 110.

A random access memory (RAM) 203 serves as a system work area (memory) for the CPU 201 and also as a temporary storage area (memory) for temporarily storing image data. The RAM 203 includes a static random access memory (SRAM), which holds the stored content after the image-forming apparatus 110 is powered off, or a dynamic random access memory (DRAM), with which the stored content is erased after the image-forming apparatus 110 is powered off.

The hard disk drive (HDD) 204 stores system software and image data.

An operation unit interface (I/F) 205 is an interface unit between the operation unit 111 and a system bus 211. The operation unit I/F 205 receives image data to be displayed on the operation unit 111 via the system bus 211 and outputs the received image data to the operation unit 111 via the system bus 211. Furthermore, the operation unit I/F 205 outputs information entered by a user via the operation unit 111 to the system bus 211.

A network I/F 206 is an interface between the LAN 150 and the system bus 211. The network I/F 206 enables inputting and outputting information between the image-forming apparatus 110 and other apparatuses connected via the LAN 150.

A modem 207 is connected to the WAN 160 and the system bus 211. The modem 207 enables inputting and outputting information between the image-forming apparatus 110 and other apparatuses connected via the WAN 160.

A scanner I/F 208 enables a user to correct, process, and edit image data received from the scanner unit 112.

The scanner I/F 208 is used when the CPU 201 detects whether the received image data is image data of a color document or a monochromatic document and whether the received image data is image data of a text document or a photograph document. The CPU 201 associates information of a result of the determination with the image data. The information associated with the image data is referred to as "attribute data".

An image-forming unit 209 converts an orientation of the image data. Furthermore, the image-forming unit 209 compresses and decompresses image data.

A printer I/F 210 receives image data from the image-forming unit 209. The printer I/F 210 is used for forming an image according to the received image data while referring to the attribute data associated with the image data. The image formed according to the received image data is output to the printer unit 113.

A user instruction to the image-forming apparatus 110 and the display of information to a user can be performed via the operation unit 111 or the client 120 connected via the LAN 150.

Figure 3:
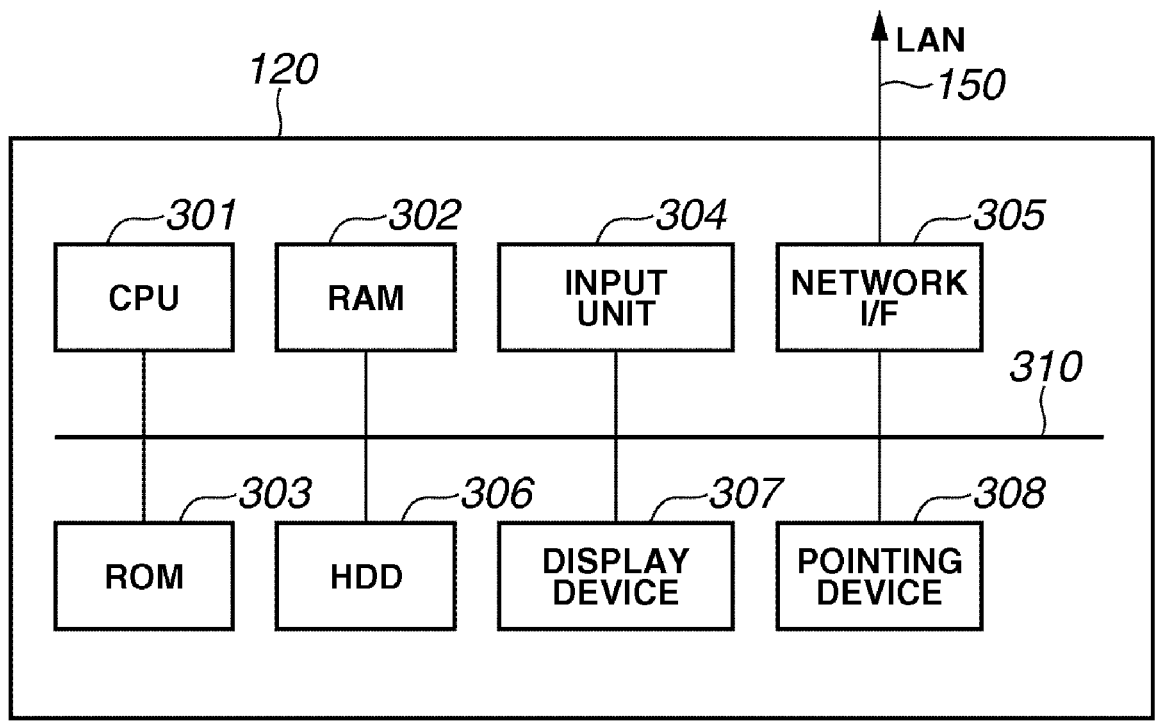
FIG. 3 illustrates an exemplary configuration of a client personal computer (PC) according to the first exemplary embodiment of the present invention.

FIG. 3 illustrates an exemplary hardware configuration of the client 120 illustrated in FIG. 1 according to the present exemplary embodiment.

Referring to FIG. 3, a CPU 301, a RAM 302, a ROM 303, an input device 304, such as a keyboard, a network I/F 305, and a hard disk drive (HDD) 306 are in communication with one another via a system bus 310.

In addition, a display device 307 including a cathode-ray tube (CRT) and a pointing device 308 including a mouse are in communication with each other via the system bus 310.

The ROM 303 or the HDD 306 previously stores a control program. The CPU 301 implements a function as a computer by reading the control program from the ROM 303 or the HDD 306 onto the RAM 302.

In addition, the CPU 301 displays various information on the display device 307 and receives a user instruction generated via the input device 304 and the pointing device 308. Furthermore, the CPU 301 communicates with other apparatuses on the LAN 150 via the network I/F 305.

The server 130 has a hardware configuration illustrated in FIG. 3 similar to that of the client 120.

Figure 4:
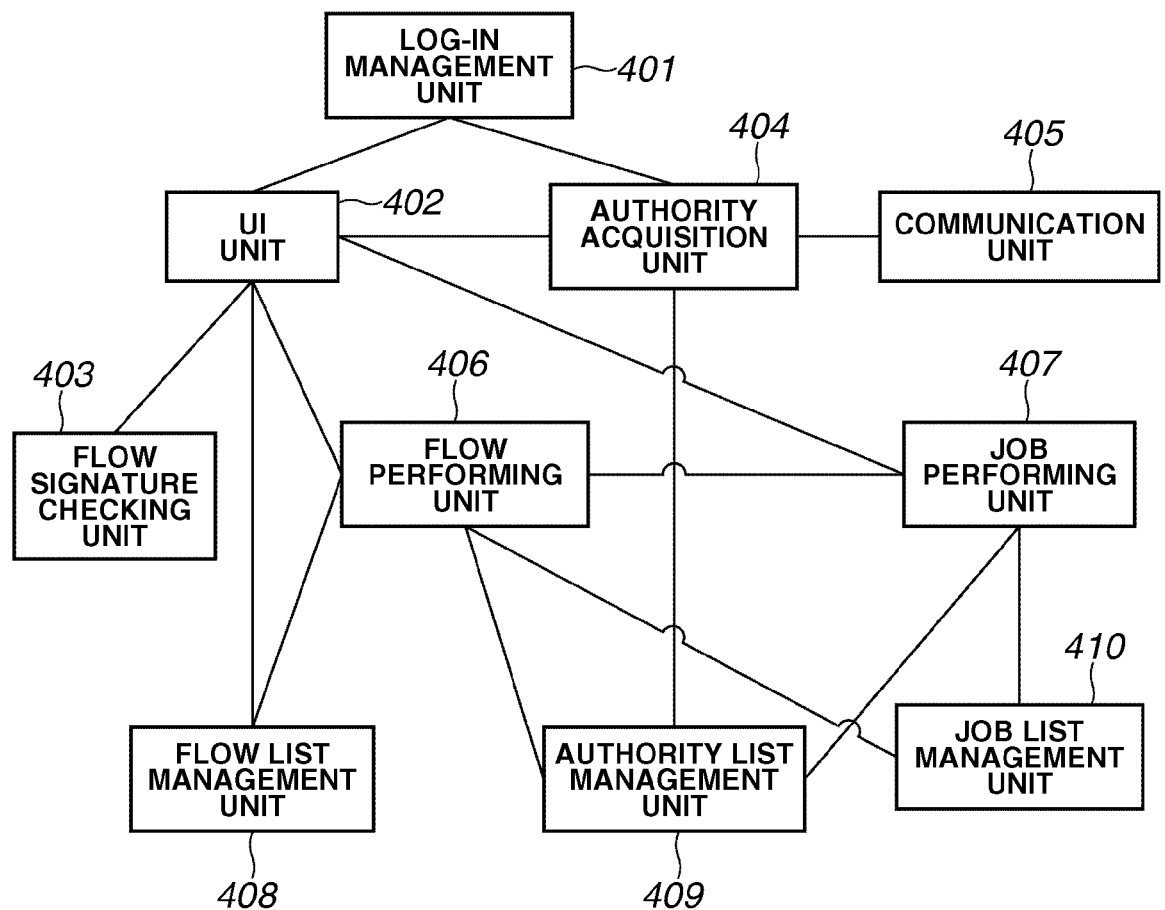
FIG. 4 illustrates an exemplary software configuration of the image-forming apparatus according to the first exemplary embodiment of the present invention.

FIG. 4 illustrates an exemplary configuration of a software module of the image-forming apparatus 110 related to performing a flow. A software module illustrated in FIG. 4 is controlled by the CPU 201.

In the present exemplary embodiment, a "flow" includes an order of performing a plurality of functions performed by the image-forming apparatus 110.

The functions performed by the image-forming apparatus 110 are not particularly limited, as long as the function is provided by the image-forming apparatus 110. The image-forming apparatus 110 can provide various functions, such as a print function, a copy function, a scan function, a data sending function, and a bookbinding function. Here, a "flow" can be an order of performing a plurality of jobs, such as a print job and a copy job corresponding to the print function and copy function performed by the image-forming apparatus 110.

Hereinbelow, in the present exemplary embodiment, processing performed by the image-forming apparatus 110 using a flow defining an order of performing a plurality of jobs will be described.

Referring to FIG. 4, a log-in management unit 401 is a software module that receives log-in information about a user having performed an operation via a UI unit 402 to manage a session of a user.

The UI unit 402 is a software module for performing a display on the operation unit 111 via the operation unit I/F 205 and processing an input by the user performed via the operation unit 111.

A signature-checking unit 403 is a software module for checking (verifying) a signature in a file describing a set of various functions of the image-forming apparatus 110 and an order of performing processing (hereinafter referred to as a "flow-setting file"). The flow-setting file will be described later below with reference to FIG. 5.

An authority-acquisition unit 404 is a software module for inquiring of the server 130 access-control information indicating whether a user is permitted to use or inhibited from using a particular function of the image-forming apparatus 110. The access-control information will be described later below with reference to FIG. 6.

A communication unit 405 is a software module for performing data communication between the image-forming apparatus 110 and other apparatuses connected thereto with an operation of the network I/F 206 and the modem 207.

A flow-performing unit 406 is a software module for analyzing a flow-setting file. The flow-performing unit 406 separates a flow into job settings (e.g., a scan job setting, a print job setting, and a send job setting) for each function.

The flow-performing unit 406 can directly perform a flow in cooperation with a job-performing unit 407 by separating a flow into job settings.

The job-performing unit 407 is a software module for generating a job according to various job settings and performing the generated job.

A flow-list management unit 408 is a software module for managing a flow-setting file. In addition, the flow-list management unit 408 manages information about which flow-performing button is to be displayed on a display of the operation unit 111 when a user has been logged into the image-forming apparatus 110. In the present exemplary embodiment, a description of a flow is handled as a file. However, a description of a flow can be held on the RAM 203.

An authority-list management unit 409 is a software module for managing access-control information about a user who has been logged into the image-forming apparatus 110.

A job-list management unit 410 is a software module for managing a job setting.

Processing by the CPU 201 for controlling performance of a flow by a user with a cooperative operation by each software module will be described later below.

Figure 5:
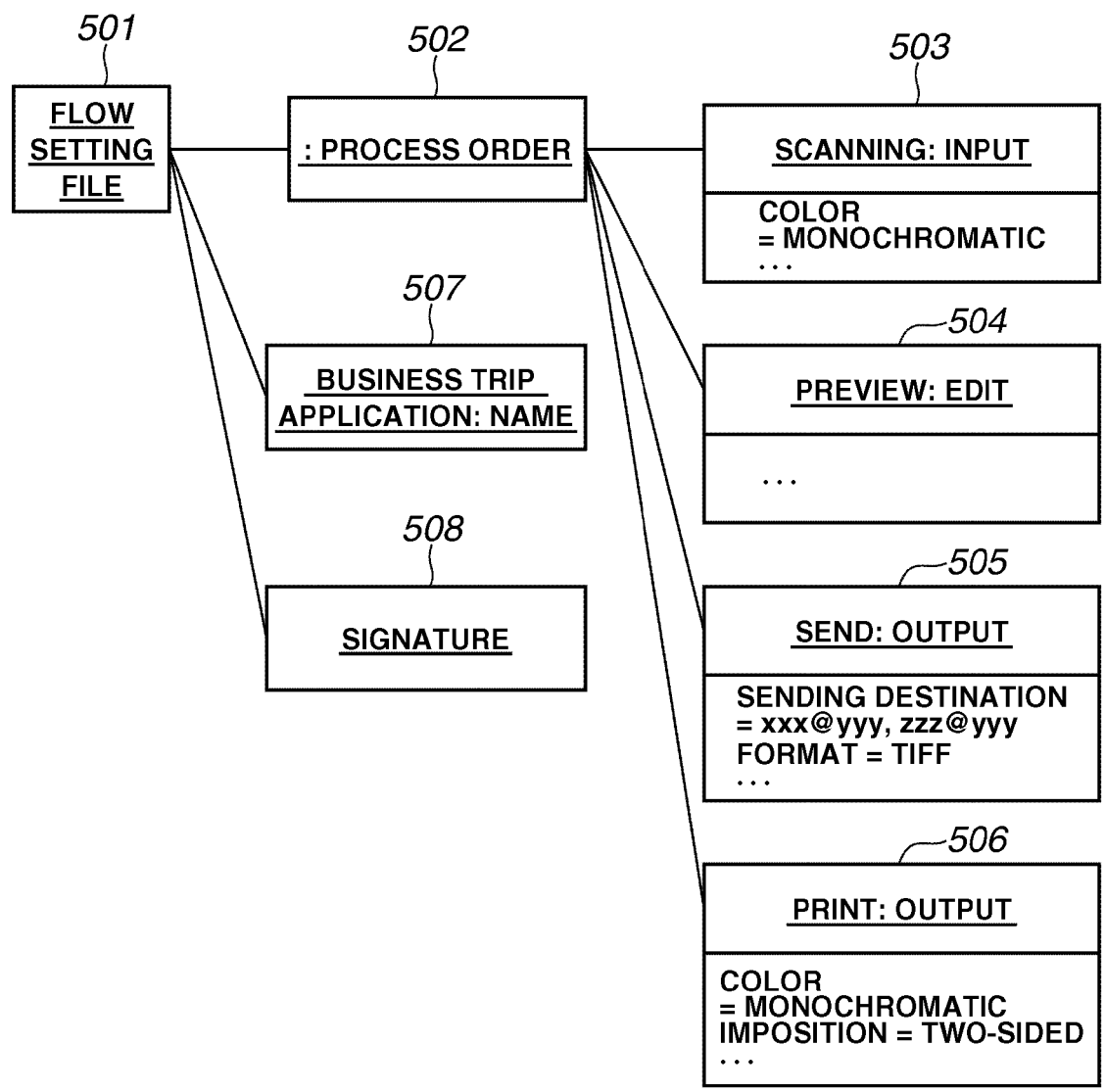
FIG. 5 illustrates an exemplary flow-setting file according to the first exemplary embodiment and a second exemplary embodiment of the present invention.

FIG. 5 illustrates an exemplary flow-setting file according to the present exemplary embodiment of the present invention.

Referring to FIG. 5, a flow-setting file 501 includes job-processing-order information 502, a flow name 507, and a signature 508. In the present exemplary embodiment, the name of the flow is "business trip application".

The job-processing-order information 502 includes an order for performing scan input processing 503 for inputting an image from the scanner unit 112, image-preview editing 504 via the operation unit 111 as an image-editing function of the image-forming apparatus 110, image-sending and -output processing 505 for sending an image via e-mail, and image-print-and-output processing 506 for printing an image. The job-processing-order information 502 includes a setting for performing the various processing in processing order of the scan input processing 503, the image-preview editing 504, and the image-sending-and-output processing 505 or the image-print-and-output processing 506.

The scan input processing 503 indicates a scan job for inputting an image from the scanner unit 112. A setting for capturing an image in a monochromatic mode or other similar setting is performed for the scan input processing 503.

The image-preview editing 504 indicates a job for displaying an image input by input processing on the operation unit 111 as a preview.

The image-sending-and-output processing 505 indicates a send job for sending an edited image via e-mail. An address and a file format for sending an image are set for the image-sending-and-output processing 505.

The image-print-and-output processing 506 indicates a print job for printing an edited image via the printer unit 113. A setting for outputting the image in a monochromatic mode and printing the image in a two-sided print mode are set for the image-print-and-output processing 506.

In the present exemplary embodiment, an image is input via the scanner unit 112. However, image data stored in a box area can be used as an input image. When a plurality of input processing is defined, subsequent processing is to be performed on all of the input image data.

In addition, editing processing can include processing such as deletion of a page and image conversion processing. In addition, output processing can include not only sending via e-mail and printing but also facsimile transmission and storage in a box area.

The signature 508 is digital signature information corresponding to the job-processing-order information 502 of the flow-setting file 501.

Signature information is generated by calculating a hash value of the job-processing-order information 502 of the flow-setting file 501 with a one-way function to generate a digest and encrypting the generated digest using a private key among a key pair in a public-key encryption system. Setting of the generated signature information to a flow-setting file is referred to as "providing a signature".

A flow may have no signature. A flow having no signature is a flow generated by a user who has no authority to provide a signature to the flow.

Information such as an identification flag can be used instead of a signature. In the case where a flow includes a plurality of existing flows, processing can be performed, which will be described later below, using a signature on a flow constituted by the plurality of existing flows, instead of using a signature on the existing flows.

In the present exemplary embodiment, a file using an extensible markup language (XML) in describing the structure illustrated in FIG. 5 in a file is used. However, the method for describing a file is not limited to this.

The flow-setting file 501 is generated using an application on the client 120. The flow-setting file 501 can be stored in the flow-list management unit 408 of the image-forming apparatus 110 via the LAN 150. In order to provide a flow with a signature, a user is required to possess a private key of a key pair according to a public-key encryption system.

In addition, a user can generate a flow using an application on the image-forming apparatus 110 after logging into the image-forming apparatus 110. In this case also, a user desiring to generate a flow is required to possess a private key of a key pair according to a public-key encryption system.

In the present exemplary embodiment, it is supposed that only a user who is an administrator of the system can provide a flow with a signature using a private key. Accordingly, if the provided signature is certified as authentic, it can be ensured that the flow having the authentic signature is a publicly open flow (hereinafter referred to as a "public flow") that can be commonly used by users of the system and generated by the administrator. Thus, an administrator of the system can generate a flow to be utilized by each administered user and make public the generated flow as a public flow.

FIG. 6 illustrates an example of access-control information set for each user, which is managed by the server 130.

Referring to FIG. 6, a field 601 indicates access-control information related to an input performed via the scanner unit 112. In the example illustrated in FIG. 6, users "User A" and "User B" are allowed to use the scanner unit 112 but a user "User C" is inhibited from using the scanner unit 112.

A field 602 indicates access-control information related to setting as to a color mode for printing. In the example illustrated in FIG. 6, the User A is allowed to perform printing in the color print mode, but the User B and the User C are allowed to perform monochromatic printing only.

A field 603 indicates access-control information related to imposition for printing. In the example illustrated in FIG. 6, the User B and the User C are allowed to perform two-sided printing only. The User A is allowed to perform both one-sided printing and two-sided printing as desired.

A field 604 indicates access-control information related to facsimile transmission. In the example illustrated in FIG. 6, the User A and the User C are allowed to perform facsimile transmission, but the User B is inhibited from performing facsimile transmission.

A field 605 indicates access-control information related to sending an e-mail. In the example illustrated in FIG. 6, the User A is allowed to send an e-mail, but the User B and the User C are inhibited from sending an e-mail.

A field 606 indicates access-control information related to data transmission according to a file transfer protocol (FTP). In the example illustrated in FIG. 6, the User A is allowed to perform data transmission via FTP, but the User B and the User C are inhibited from performing data transmission via FTP.

An arbitrary field can be used for the field related to access-control for a function as long as the field is related to controlling the function of the image-forming apparatus 110.

In the present exemplary embodiment, the access is controlled for each user. However, the access control can be performed for each user group, such as a department to which a user belongs. In this case, if a user belongs to a plurality of groups at the same time, the access control can be performed on either one of the plurality of groups for the user.

When a user has logged into the image-forming apparatus 110, information in a portion of access-control information describing information about the user is sent to the image-forming apparatus 110.

Figure 7:
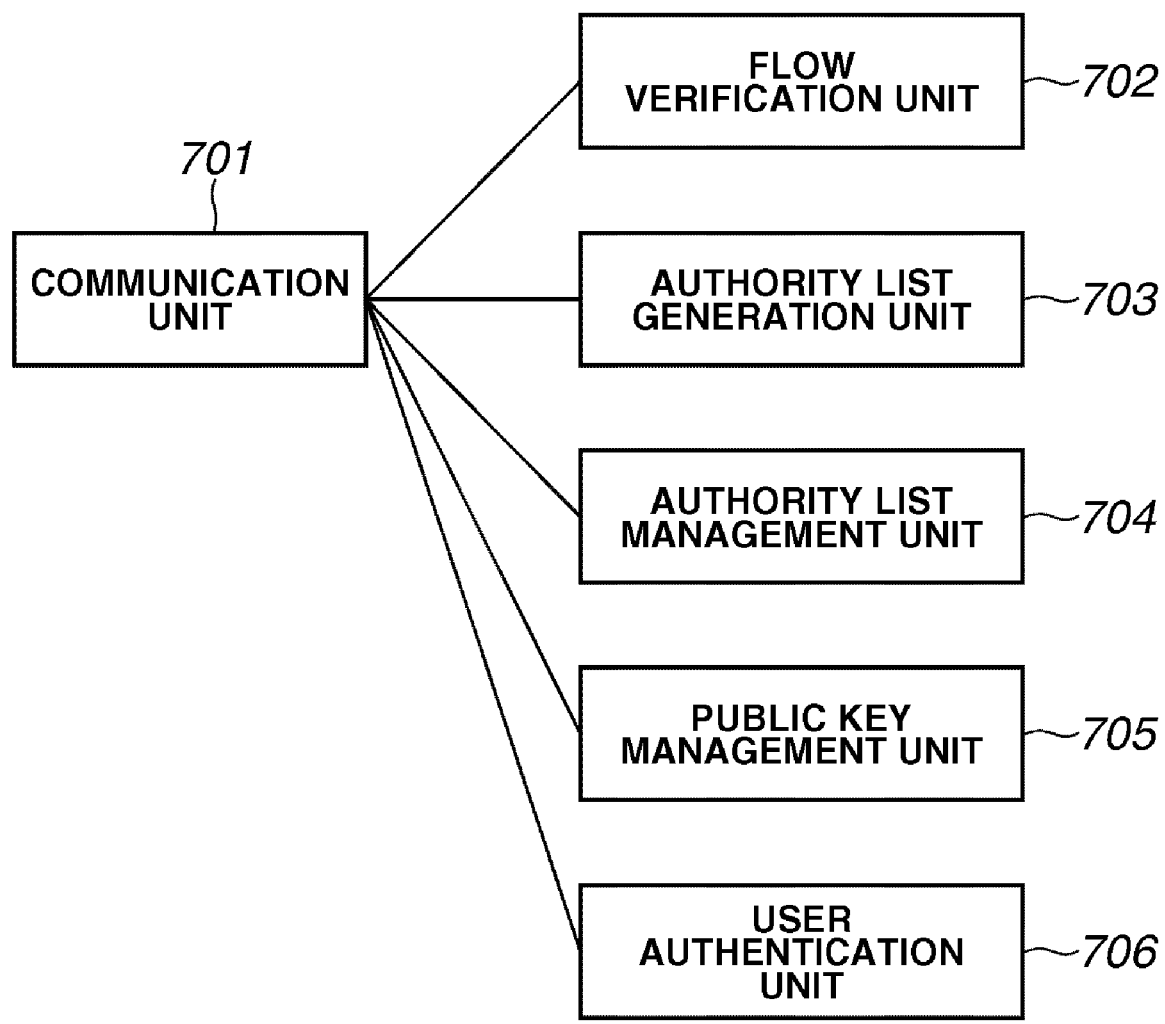
FIG. 7 illustrates an exemplary software configuration of a control server according to the first exemplary embodiment of the present invention.

FIG. 7 illustrates an exemplary software module configuration related to access-control management by the server 130 according to the present exemplary embodiment.

Referring to FIG. 7, a communication unit 701 is a software module for performing processing instructed by a user via the image-forming apparatus 110 via the network I/F 305.

A flow-verification unit 702 is a software module for analyzing and verifying a flow-setting file.

An authority-list generation unit 703 is a software module for generating access-control information.

An authority-list management unit 704 is a software module for managing the access-control information illustrated in FIG. 6 for each user.

A public-key management unit 705 is a software module for managing a public key according to a public-key encryption system. An administrator of the system can previously set a public key on the server 130. Alternatively, the administrator of the system can separately inquire a public key of a key server (not shown), which is connected via the LAN 150.

A user-authentication unit 706 is a software module for receiving user authentication information and determining whether a user can be authenticated.

Figure 8:
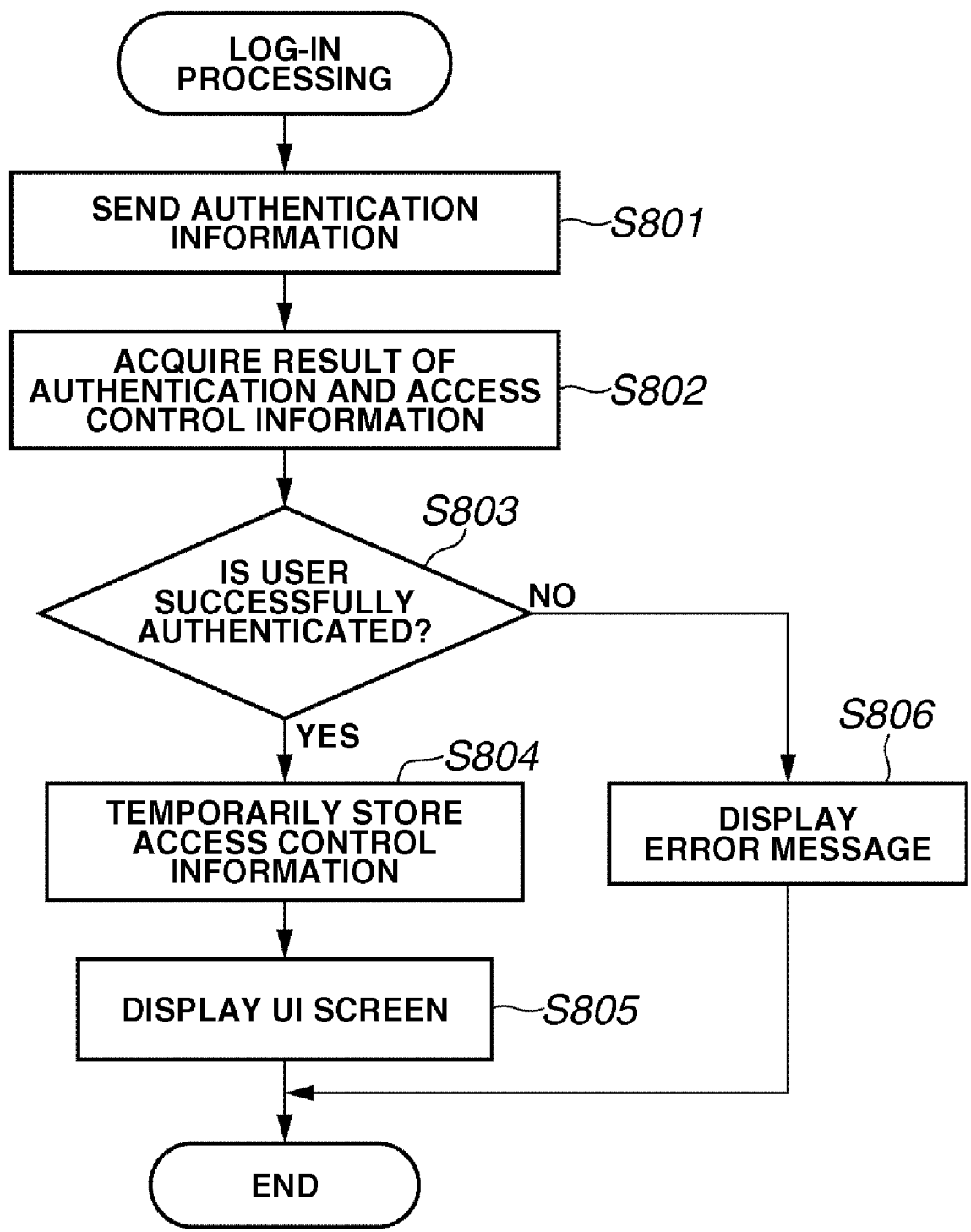
FIG. 8 is a flow chart illustrating exemplary log-in processing according to the first exemplary embodiment of the present invention.

FIG. 8 is a flow chart illustrating a flow of a program for processing performed when a user desires to log into the image-forming apparatus 110, which is performed with the CPU 201 of the image-forming apparatus 110 according to the present exemplary embodiment.

When a user enters a user name and a password via the operation unit 111 of the image-forming apparatus 110, the processing illustrated in the flow chart of FIG. 8 is started. The present exemplary embodiment handles a user name and a password as authentication information to authenticate a user. However, information input from an integrated circuit (IC) card or biometric information can be used as authentication information to authenticate a user.

Referring to FIG. 8, in step S801, the CPU 201 transfers user authentication information to the server 130 to perform user authentication and to acquire access-control information. More specifically, the UI unit 402 transfers user authentication information sent from the operation unit 111 to the log-in management unit 401.

Then, the log-in management unit 401 transfers the received user authentication information to the authority-acquisition unit 404 and requests access-control information for the user having been logged into the image-forming apparatus 110 (log-in user). The authority-acquisition unit 404 requests, via the communication unit 405, the server 130 to authenticate the user and to acquire the access-control information.

In step S802, the CPU 201 waits until the user is authenticated by the server 130 and the server 130 sends the access-control information requested in step S801. The authority-acquisition unit 404 receives the reply from the server 130 via the communication unit 405 and then transfers information about whether the user has been authenticated to the log-in management unit 401. At this time, if no reply is sent from the server 130 before a predetermined length of time elapses, the communication unit 405 determines that the user has not been successfully authenticated.

In step S803, the log-in management unit 401 determines whether the user has been successfully authenticated in step S802. If it is determined in step S803 that the user has been successfully authenticated (YES in step S803), then the CPU 201 advances to step S804. On the other hand, if it is determined in step S803 that the user has not been successfully authenticated (NO in step S803), then the CPU 201 advances to step S806.

In step S804, the log-in management unit 401 causes the authority-acquisition unit 404 to store the access-control information for the log-in user received from the server 130 in the authority-list management unit 409.

In step S805, the log-in management unit 401 notifies the UI unit 402 that the user has been successfully logged into the image-forming apparatus 110, and the CPU 201 displays a UI screen for the log-in user (e.g., an UI screen illustrated in FIG. 10) on a display of the operation unit 111.

Processing in step S806 is performed when the user has not been successfully authenticated. In step S806, the log-in management unit 401 notifies the UI unit 402 that the user has not been successfully logged into the image-forming apparatus 110 and displays an error message on the display of the operation unit 111.

The log-in processing in the image-forming apparatus 110 is as described above. With the above-described processing, the image-forming apparatus 110 can acquire the access-control information for the log-in user from the server 130.

If a user does not perform an operation for a predetermined length of time or when a user generates an instruction for logging out of the image-forming apparatus 110 via the operation unit 111, the log-in management unit 401 deletes, via the authority-acquisition unit 404, the access-control information for the log-in user stored in the authority-list management unit 409. Furthermore, the log-in management unit 401 notifies the UI unit 402 that the user has not performed an operation for a predetermined length of time or that the user has generated an instruction for logging out. Then, the UI unit 402 displays a log-in screen on the display of the operation unit 111.

Figure 9:
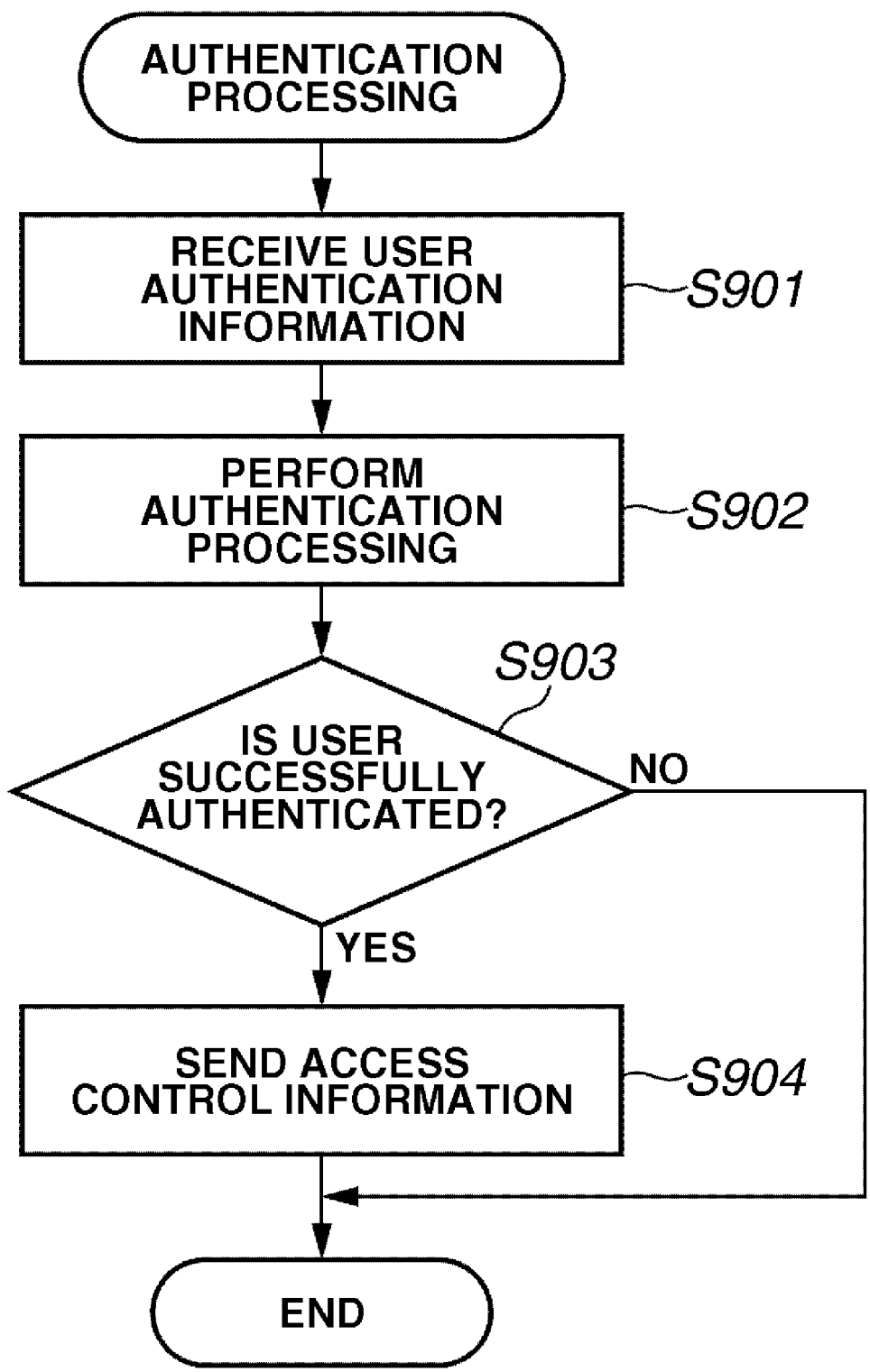
FIG. 9 is a flow chart illustrating exemplary user-authentication processing according to the first exemplary embodiment of the present invention.

FIG. 9 is a flow chart illustrating a flow of processing performed by the server 130 with the CPU 301 when the server 130 has received the user authentication information from the image-forming apparatus 110 according to the present exemplary embodiment.

Referring to FIG. 9, in step S901, the communication unit 701 receives user authentication information from the image-forming apparatus 110.

In step S902, the user-authentication unit 706 performs user-authentication processing using the user authentication information sent from the communication unit 701. In the user-authentication processing, a user name and password information stored in the server 130 are collated with the user authentication information sent from the communication unit 701. However, the method for authenticating a user is not limited to collation of a password with user authentication information.

In step S903, the CPU 301 determines whether the user has been successfully authenticated in step S902. If it is determined in step S903 that the user has been successfully authenticated in step S902 (YES in step S903), then the CPU 301 advances to step S904. On the other hand, if it is determined in step S903 that the user has not been successfully authenticated in step S902 (NO in step S903), then the CPU 301 sends to the image-forming apparatus 110 information indicating that the user has not been successfully authenticated in step S902, and then the processing ends.

In step S904, the user-authentication unit 706 notifies the communication unit 701 that the user has been successfully authenticated in step S902. Then, the communication unit 701 requests the authority-list management unit 704 to generate access-control information for the user who has been successfully authenticated. After receiving access-control information from the authority-list management unit 704, the communication unit 701 sends the received access-control information to the image-forming apparatus 110, which has requested the access-control information.

As described above, the server 130 authenticates a user. With the above-described processing, the image-forming apparatus 110 can acquire information about whether a user is permitted to log into the image-forming apparatus 110 and the access-control information for the user.

Figure 10:
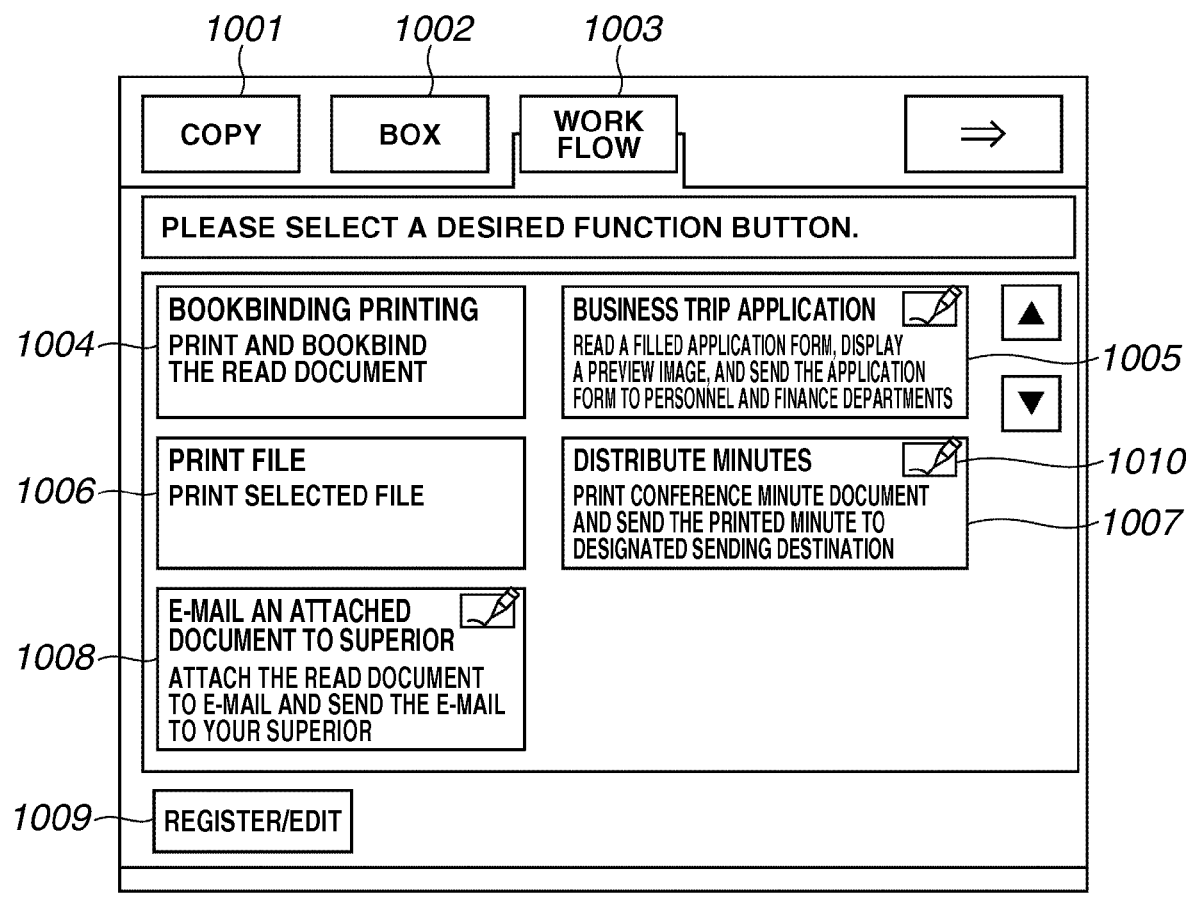
FIG. 10 illustrates an example of a user interface (UI) screen displayed when a user has logged into the image-forming apparatus according to the first exemplary embodiment of the present invention.

FIG. 10 illustrates an example of a UI screen displayed when a user has logged into the image-forming apparatus 110. A case where the User B (FIG. 6) has logged into the image-forming apparatus 110 will be described below.

Referring to FIG. 10, buttons 1001, 1002, and 1003 respectively enable a user to display an application installed on the image-forming apparatus 110. More specifically, the button 1001 enables the user to display a screen for a copy application. The button 1002 enables the user to display a screen for a box operation application. The button 1003 enables the user to display a screen for an application for performing a flow (hereinafter referred to as a "workflow application"). In the example illustrated in FIG. 10, the user has pressed the button 1003 and, thus, the screen for the workflow application is displayed.

At this time, the User B is inhibited from using all the sending functions according to the access-control information (FIG. 6). Accordingly, a button for calling a screen for a sending application is not displayed.

Buttons 1004, 1005, 1006, 1007, and 1008 respectively enable a user to call a flow displayed on the workflow application screen to perform the called flow. The buttons 1005, 1007, and 1008 respectively have an icon 1010 thereon. The icon 1010 on each of the buttons 1005, 1007, and 1008 indicates that the flow has a signature.

A button 1009 enables a user to call a screen for registering or editing a flow. When the user presses the button 1009, the user can generate a flow-setting file, such as the one illustrated in FIG. 5, and register the generated flow-setting file with the flow-list management unit 408.

The user can edit a flow having already been registered to the flow-list management unit 408. The user can generate a flow by designating a plurality of jobs to be included in the flow, the job-processing-order information 502 (FIG. 5), the flow name 507 (FIG. 5), and the signature 508 (FIG. 5).

For example, when the user presses the button 1001 to display the copy application UI screen for performing a copy operation, the following processing is performed.

The access-control information for the User B indicates access control for permitting monochromatic printing and two-sided printing only. The UI unit 402 refers to the authority-list management unit 409 for the above-described access control for the User B. Accordingly, the User B cannot select a color copying operation and a one-sided copying operation. That is, the User B can perform only monochromatic two-sided printing.

In addition, when the user presses the button 1002 to display the box operation application UI for printing an image previously input from the client 120, the following processing is performed.

Suppose here that the print setting for the image input from the client 120 includes permission for performing color printing and one-sided printing. In this case, if a print job is input via the UI unit 402, the job setting is changed to a monochromatic two-sided copy operation by referring to the access-control information stored in the authority-list management unit 409 with the job-performing unit 407.

The control for operating and performing a job can be implemented and performed by executing a processing program stored in the image-forming apparatus 110 with the CPU 201.

Now, processing for performing a flow, which is performed when the user presses each of buttons 1004 through 1008 (FIG. 10), will be described below.

Figure 11:
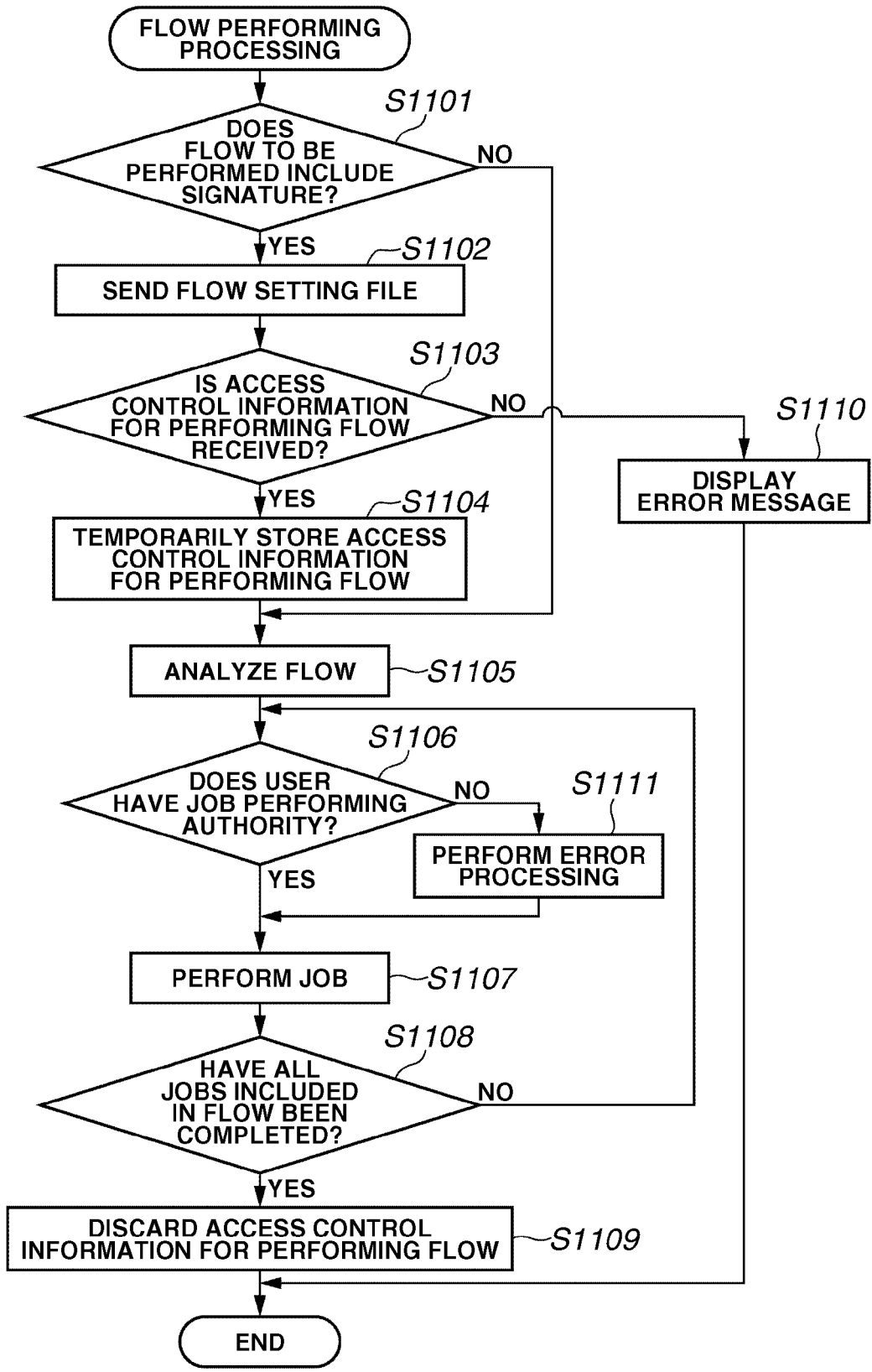
FIG. 11 is a flow chart illustrating an exemplary flow of processing for performing a flow according to the first exemplary embodiment of the present invention.

FIG. 11 is a flow chart illustrating processing performed with the CPU 201 based on a program for performing a flow according to the present exemplary embodiment.

Referring to FIG. 11, in step S1101, the CPU 201 determines whether the flow to be performed corresponding to the button pressed by the user includes a signature. The UI unit 402 searches the flow-list management unit 408 for a flow-setting file corresponding to the pressed button and transfers the flow-setting file to the signature-checking unit 403.

After receiving the flow-setting file, the signature-checking unit 403 analyzes a signature portion of the flow-setting file to check whether a signature has been provided to the flow. The signature-checking unit 403 sends the UI unit 402 a result of the checking. If it is determined in step S1101 that the flow includes a signature (YES in step S1101), then the CPU 201 advances to step S1102. On the other hand, if it is determined in step S1101 that the flow does not include a signature (NO in step S1101), then the CPU 201 advances to step S1105.

In step S1102, the UI unit 402 transfers the flow-setting file to the authority-acquisition unit 404. After receiving the flow-setting file from the UI unit 402, the authority-acquisition unit 404, in order to acquire access-control information for performing the flow, sends the flow-setting file to the server 130 via the communication unit 405. Then, the printer I/F 210 receives a reply from the server 130 via the communication unit 405. Processing performed by the server 130 at this time will be described in detail later below.

In step S1103, the CPU 201 determines whether access-control information has been received from the server 130 in step S1102. If it is determined in step S1103 that access-control information has been received from the server 130 in step S1102 (YES in step S1103), in which case the flow to be performed is determined to be a public flow and the user is provided with an authority to perform the flow, then the CPU 201 advances to step S1104.

If error information is received from the server 130, the flow to be performed has a signature but is not determined to be a public flow. That is, if it is determined in step S1103 that no access-control information has been received from the server 130 (NO in step S1103), then the CPU 201 advances to step S1110. In step S1110, the CPU 201 displays an error message on the display of the operation unit 111, and then the processing ends.

In step S1104, the CPU 201 stores the access-control information received in step S1102 to manage the access-control information with the authority-list management unit 409. At this time, the authority-list management unit 409 associates the access-control information with the flow to be performed and stores the same.

In step S1105, the CPU 201 analyzes the flow to be performed with the flow-performing unit 406 to divide the flow to be performed into units of job. The flow-performing unit 406 sets the jobs defined in the flow-setting file to the job-list management unit 410 according to the predetermined processing order.

In setting a job to the job-list management unit 410, the job is associated with information indicating in which flow the job has been included. Then, the flow-performing unit 406 generates an instruction to the job-performing unit 407 for performing the jobs included in the flow according to the predetermined processing order.

In step S1106, the job-performing unit 407 checks whether the user has an authority to perform the job to be performed included in the flow to be performed.

If access-control information associated with the flow to be performed exists, the job-performing unit 407 collates the access-control information associated with the flow to be performed with the job setting. On the other hand, if no access-control information associated with the flow to be performed exists, the job-performing unit 407 collates the setting included in the job to be performed with the access-control information within an authority list for the log-in user, which has been acquired at the time of the above-described log-in processing.

If it is determined in step S1106 that the job setting is restricted by the access-control information and thus the job cannot be performed according to the setting (NO in step S1106), then the CPU 201 advances to step S1111. On the other hand, if it is determined in step S1106 that the job setting is not restricted by the access-control information and thus the job can be performed according to the setting (YES in step S1106), then the CPU 201 advances to step S1107.

The processing in step S1111 is performed when it is determined that the job cannot be performed according to the setting as a result of collation of the job setting and the access-control information. That is, in step S1111, the CPU 201 performs error processing. In this case, in step S1111, the CPU 201 modifies the job setting to a job setting not restricted by the access-control information and with which the job can be performed. Then, the CPU 201 advances to step S1107.

Whether the job setting is to be modified and whether the user performs the job with the modified job setting can be selected by the user via the operation unit 111. If the user selects not to perform the job, the CPU 201 suspends performing the job.

In the case of canceling the job, the subsequent flow cannot be performed. In this case, the CPU 201 deletes jobs of the flow to be performed from the job-list management unit 410.

In step S1107, the CPU 201 performs the job included in the flow to be performed. More specifically, in step S1107, the job-performing unit 407 reads the job setting and determines the type of the read job. If it is determined that the job type of the read job is a scan job, the CPU 201 allows the user to perform a setting for reading a document with the scanner unit 112 via the scanner I/F 208 to perform scanning.

If it is determined that the job type of the read job is an editing job, the CPU 201 allows the user to perform an editing operation on the document to be edited, which is managed within the HDD 204. In the case of a print job and a facsimile transmission job, the printer I/F 210 performs the job using necessary hardware.

In step S1108, the CPU 201 determines whether all of the jobs included in the flow to be performed have been already performed.

If it is determined in step S1108 that all of the jobs included in the flow to be performed and managed in the job-list management unit 410 have been already performed (YES in step S1108), then the CPU 201 advances to step S1109. On the other hand, if it is determined in step S1108 that all of the jobs included in the flow to be performed have not been performed yet (NO in step S1108), then the CPU 201 advances to step S1106 to perform the next job included in the flow to be performed.

In step S1109, the CPU 201 deletes (discards) the access-control information related to the flow to be performed. Then, the processing ends.

As described above, the CPU 201 performs the processing illustrated in the flow chart of FIG. 11. With the processing illustrated in FIG. 11, in performing a public flow having a signature, the CPU 201 of the image-forming apparatus 110 acquires the access-control information for the flow to be performed from the server 130. Accordingly, the user can perform the flow.

In the case where the image-forming apparatus 110 has acquired access-control information for a flow having a signature in step S1106, the log-in user can perform a job included in the flow according to the access-control information acquired based on the flow, even if the log-in user does not have an authority to perform the job.

In the present exemplary embodiment, when access-control information associated with a flow to be performed exists, the flow is performed according to the access-control information. However, the job can be performed according to the access-control information associated with the flow to be performed only when the job cannot be performed according to the access-control information for the log-in user.

Now, processing for verifying a flow having a signature performed by the server 130 according to the present exemplary embodiment will be described below.

When the image-forming apparatus 110 has performed a flow and the flow-setting file is sent from the image-forming apparatus 110 to the server 130 in step S1102 (FIG. 11), the server 130 performs the verification processing.

Figure 12:
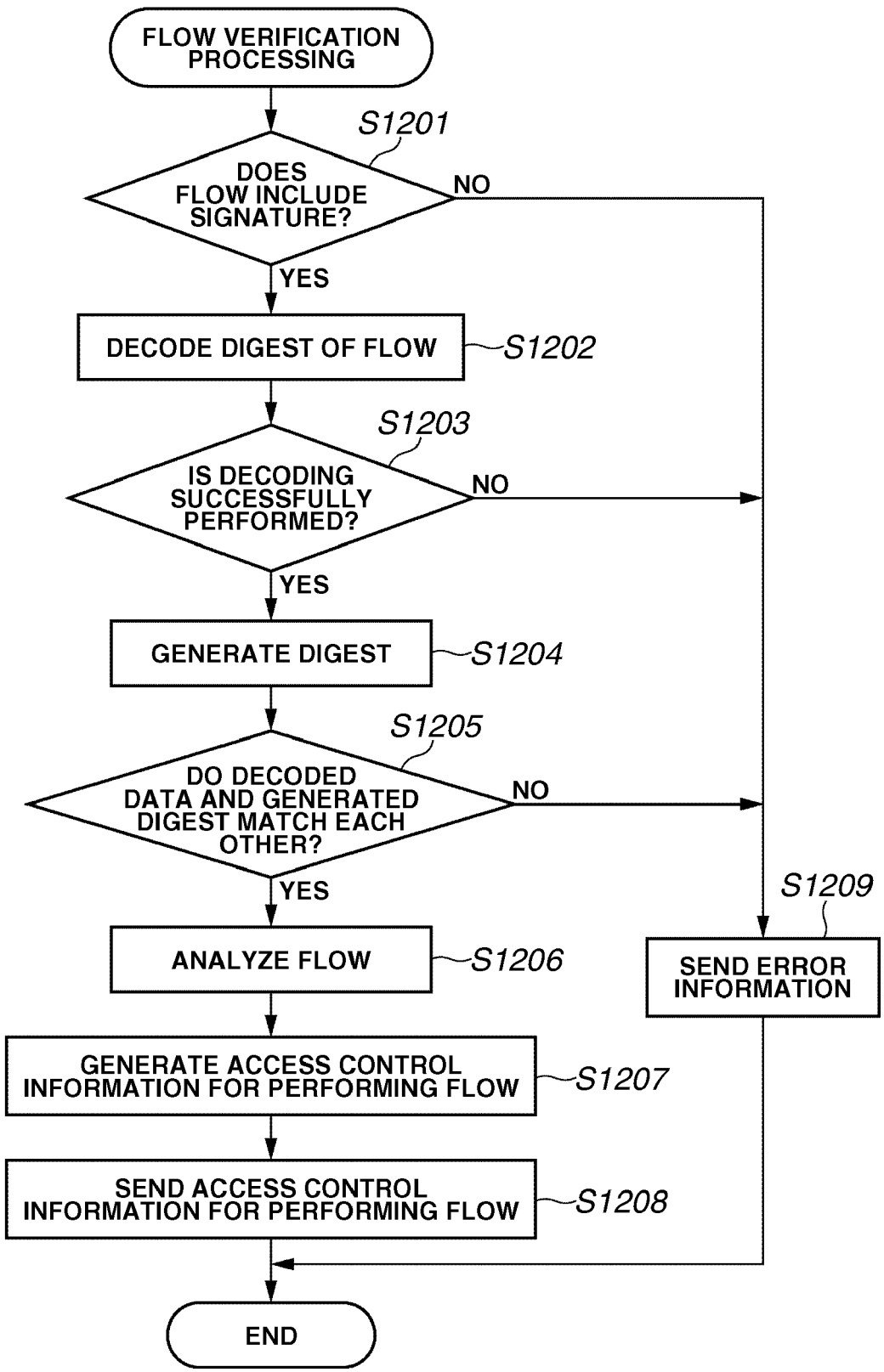
FIG. 12 is a flow chart illustrating an exemplary flow of processing for verifying a flow according to the first exemplary embodiment of the present invention.

FIG. 12 is a flow chart illustrating processing performed with the CPU 301 of the server 130 based on a program for verifying a flow according to the present exemplary embodiment.

Referring to FIG. 12, in step S1201, the flow-verification unit 702 checks whether the flow-setting file received by the communication unit 701 has a signature. If it is determined in step S1201 that the flow has a signature (YES in step S1201), then the CPU 301 advances to step S1202. On the other hand, if it is determined in step S1201 that the flow does not have a signature (NO in step S1201), then the CPU 301 advances to step S1209.

In step S1202, the flow-verification unit 702 decodes a digest of the flow from the signature extracted from the flow-setting file. Here, the flow-verification unit 702 decodes the signature extracted from the flow-setting file using a public key for verifying a public flow managed by the public-key management unit 705.

A private key for verifying a public flow can be known only by a user who has generated the public flow. In addition, since encryption has been performed with the private key, if the signature is not successfully decoded, the flow can be determined as not being a public flow. On the other hand, if the signature has been successfully decoded, it can be determined that the flow is a public flow. That is, in this case, the flow is determined to be authentic.

In step S1203, the CPU 301 of the server 130 determines whether the signature has been successfully decoded in step S1202. If it is determined in step S1203 that the signature has been successfully decoded (YES in step S1203), then the CPU 301 advances to step S1204. On the other hand, if it is determined in step S1203 that the signature has not been successfully decoded (NO in step S1203), then the CPU 301 advances to step S1209.

In step S1204, the CPU 301 generates a digest by calculating a hash value for the job-processing-order information 502 for the flow-setting file with a one-way function. The method for calculating a hash value is similar to that used in generating a signature.

In step S1205, the CPU 301 determines whether the data decoded in step S1202 and the digest generated in step S1204 match each other. If it is determined in step S1205 that the data decoded in step S1202 and the digest generated in step S1204 match each other (YES in step S1205), then the CPU 301 determines that the flow to be performed has not been altered, and then advances to step S1206. On the other hand, if it is determined in step S1205 that the data decoded in step S1202 and the digest generated in step S1204 do not match each other (NO in step S1205), then the CPU 301 determines that the flow to be performed has been altered, and then advances to step S1209.

In step S1206, the authority-list generation unit 703 analyzes the flow. More specifically, the CPU 301 extracts information described in a field related to access control with respect to the job described in the flow-setting file. For example, the CPU 301 extracts information about setting as to color setting and imposition for the print job.

In step S1207, the CPU 301 generates access-control information with which the job can be performed according to the information described in the field related to the access-control information extracted in step S1206. For example, if the color setting for the print job is set to "color" and the imposition for the print job is set to "one-sided" according to the access-control information extracted in step S1206, the CPU 301 generates access-control information describing the color setting for the print job "color" and the imposition for the print job "not restricted".

In step S1208, the CPU 301 sends the access-control information for performing the flow generated in step S1207 to the image-forming apparatus 110, and then ends the processing.

In step S1209, the flow-verification unit 702 sends error information to the image-forming apparatus 110, and then the CPU 301 ends the processing.

With the above-described series of operations, when the server 130 determines that the flow-setting file sent from the image-forming apparatus 110 is a public flow, the server 130 can send access-control information with which the flow can be appropriately performed.

Suppose, for example, that in an office, a flow for applying for a business trip in which a user scans an application form using an image-forming apparatus and sends the filled application form to a management department via e-mail has been provided to the user.

Furthermore, suppose that the user is inhibited from using the e-mail sending function of the image-forming apparatus according to access-control information. In this case, when the user attempts to actually perform the flow, the user can scan the application form but cannot send the application form via e-mail. Thus, the user cannot perform the business trip application flow. Meanwhile, an administrator of the system desires to allow the user to perform the business trip application flow because the administrator has already provided the user with the business trip application flow as a routine work for applying for a business trip.

Thus, in allowing the user to perform the business trip application flow in this case, it is necessary for the administrator to temporarily release a restriction according to the access-control information for the user and to reset content of the access-control information to the original content (the same content as that before the access control was released) after the user has completely performed the flow. That operation may be very complicated.

According to the present exemplary embodiment, in controlling performance of the function of the image-forming apparatus 110, an authority to perform a flow can be flexibly provided to a user in the case of performing a specific flow. More specifically, under a management system environment in which the function of the image-forming apparatus 110 is restricted for a user, an administrator of the system can flexibly provide the user with an authority to perform a job despite that the function related to the job is restricted for the user, in the case of a public flow that has been previously permitted by an administrator of the system.

In the present exemplary embodiment, an operation convenient in the case where the operations are performed in a predetermined routine order and have a predetermined setting content is previously registered as a public flow. Accordingly, an image-forming apparatus highly convenient for a user can be implemented. In addition, the present exemplary embodiment can provide a user with desired processing as a flow without causing a system administrator to perform processing for exceptionally authenticating and permitting each job.

In the present exemplary embodiment, when the server 130 determines a flow as a public flow, the server 130 sends to the image-forming apparatus 110 access-control information with which the flow can be appropriately performed. However, the server 130 can send information indicating permission to use all of the functions of the image-forming apparatus 110. In this case, the image-forming apparatus 110, in step S106, determines that the user has an authority to perform all of the functions of the image-forming apparatus 110. With this configuration, the present exemplary embodiment can be as useful as described above.

Second Exemplary Embodiment

Now, a second exemplary embodiment of the present invention will be described below. In the second exemplary embodiment, a flow is performed according to the authority of a user who has generated the flow, not according to the authority of the user desiring to perform the flow.

The second exemplary embodiment differs from the first exemplary embodiment in the processing performed for performing a flow. In addition, in the present exemplary embodiment, public keys for a plurality of users are set in the public-key management unit 705 of the server 130. Alternatively, the public-key management unit 705 can acquire a public key for each user via the LAN 150.

In the second exemplary embodiment, a signature on the flow-setting file 501 is performed by a user who has generated the flow to be used by another user, by using a private key of the user after generating a digest based on information indicating a processing order described in the flow.

Now, processing for performing a flow when the user has pressed each of the buttons 1004 through 1008 (FIG. 10) according to the second exemplary embodiment will be described below.

Figure 13:
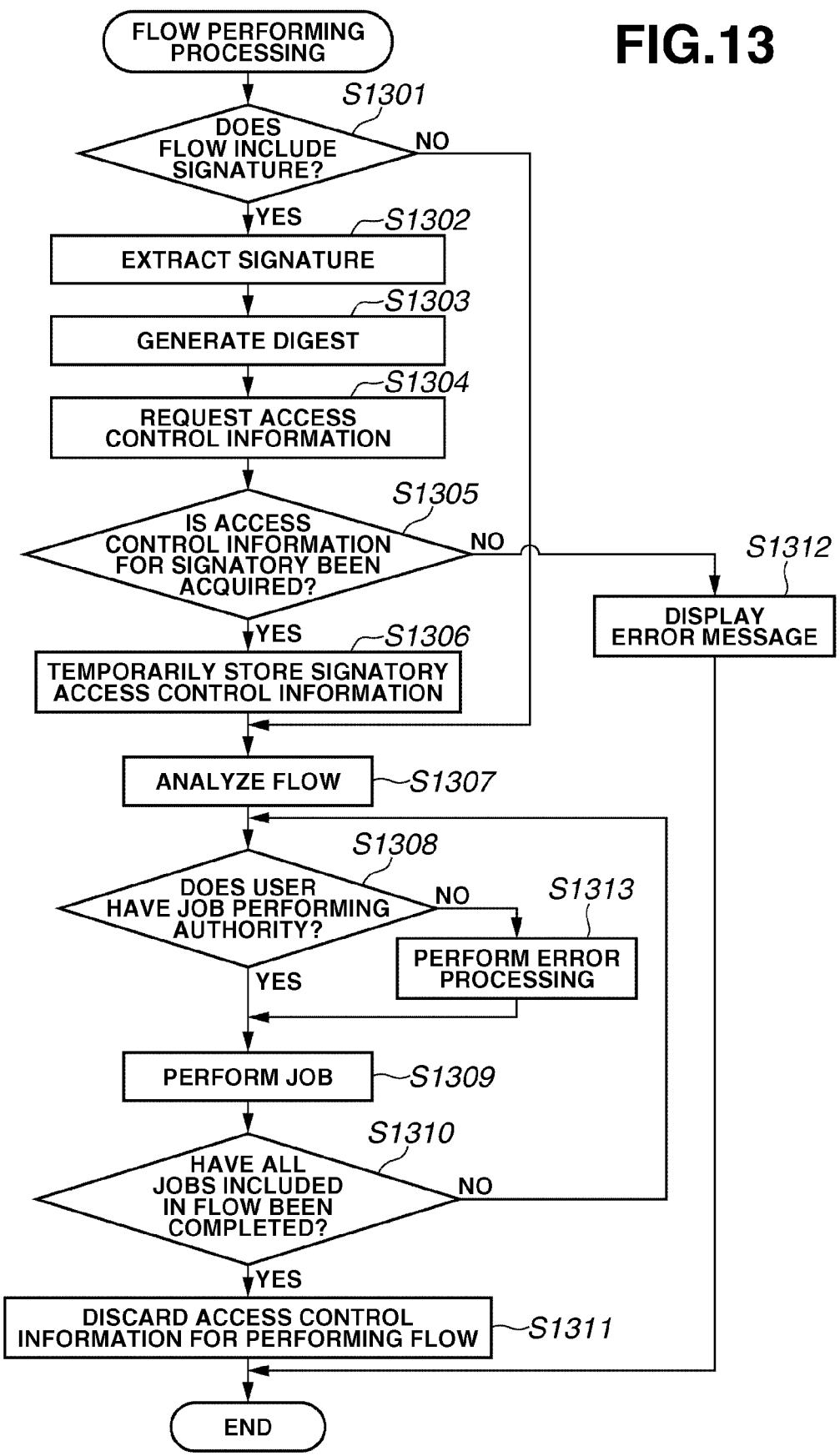
FIG. 13 is a flow chart illustrating an exemplary flow of processing for performing a flow according to the second exemplary embodiment of the present invention.

FIG. 13 is a flow chart illustrating processing performed according to a program for performing a flow with the CPU 201 of the image-forming apparatus 110.

Referring to FIG. 13, in step S1301, the CPU 201 determines whether the flow to be performed corresponding to the button pressed by the user includes a signature. Here, the UI unit 402 searches the flow-list management unit 408 for a flow-setting file corresponding to the pressed button and transfers the flow-setting file to the signature-checking unit 403.

After receiving the flow-setting file, the signature-checking unit 403 analyzes a signature portion of the flow-setting file to check whether a signature has been provided to the flow. The signature-checking unit 403 sends the UI unit 402 a result of the checking. If it is determined in step S1301 that the flow includes a signature (YES in step S1301), then the CPU 201 advances to step S1302. On the other hand, if it is determined in step S1301 that the flow does not include a signature (NO in step S1301), then the CPU 201 advances to step S1307.

In step S1302, the signature-checking unit 403 extracts a signature from the flow-setting file for the flow to be performed.

In step S1303, the signature-checking unit 403 generates a digest by calculating a hash value for the job-processing-order information 502 related to the flow to be performed with a one-way function. At this time, the same one-way function as that used in providing a signature to the flow is used.

In step S1304, the CPU 201 sends the signature extracted in step S1302 and the digest generated in step S1303 to the server 130 so that the authority-acquisition unit 404 can acquire access-control information for the user having provided a signature to the flow to be performed. The authority-acquisition unit 404 receives a reply from the server 130 via the communication unit 405. The processing performed here by the server 130 will be described later below.

In step S1305, the CPU 201 determines whether access-control information has been received from the server 130 in step S1304. If it is determined in step S1305 that access-control information has been received from the server 130 in step S1304 (YES in step S1305), in which case it is determined that the image-forming apparatus 110 has received the access-control information for the user having generated the flow to be performed and provided the flow with a signature, then the CPU 201 advances to step S1306. On the other hand, if it is determined in step S1305 that no access-control information has been received from the server 130 (NO in step S1305), then the CPU 201 advances to step S1312. In step S1312, the CPU 201 displays an error message on the display of the operation unit 111, and then the processing ends.

In step S1306, the CPU 201 stores the access-control information received in step S1304 to manage the access-control information with the authority-list management unit 409. At this time, the authority-list management unit 409 associates the access-control information with the flow to be performed and stores the same.

In step S1307 and subsequent steps, the CPU 201 performs processing similar to that in step S1105 and subsequent steps (FIG. 1) described in the first exemplary embodiment.

As described above, the processing for performing the flow according to the second exemplary embodiment is performed. With the processing illustrated in FIG. 13, in performing a public flow having a signature, the CPU 201 of the image-forming apparatus 110 acquires the access-control information for the user having generated a flow to be performed and provided the flow with a signature from the server 130. Accordingly, the image-forming apparatus 110 can perform the flow based on the access-control information.

Now, processing for verifying a flow having a signature performed by the server 130 according to the present exemplary embodiment will be described below.

When the image-forming apparatus 110 performs a flow and the signature and the digest are sent from the image-forming apparatus 110 to the server 130 in step S1304 (FIG. 13), the server 130 performs the verification processing.

Figure 14:
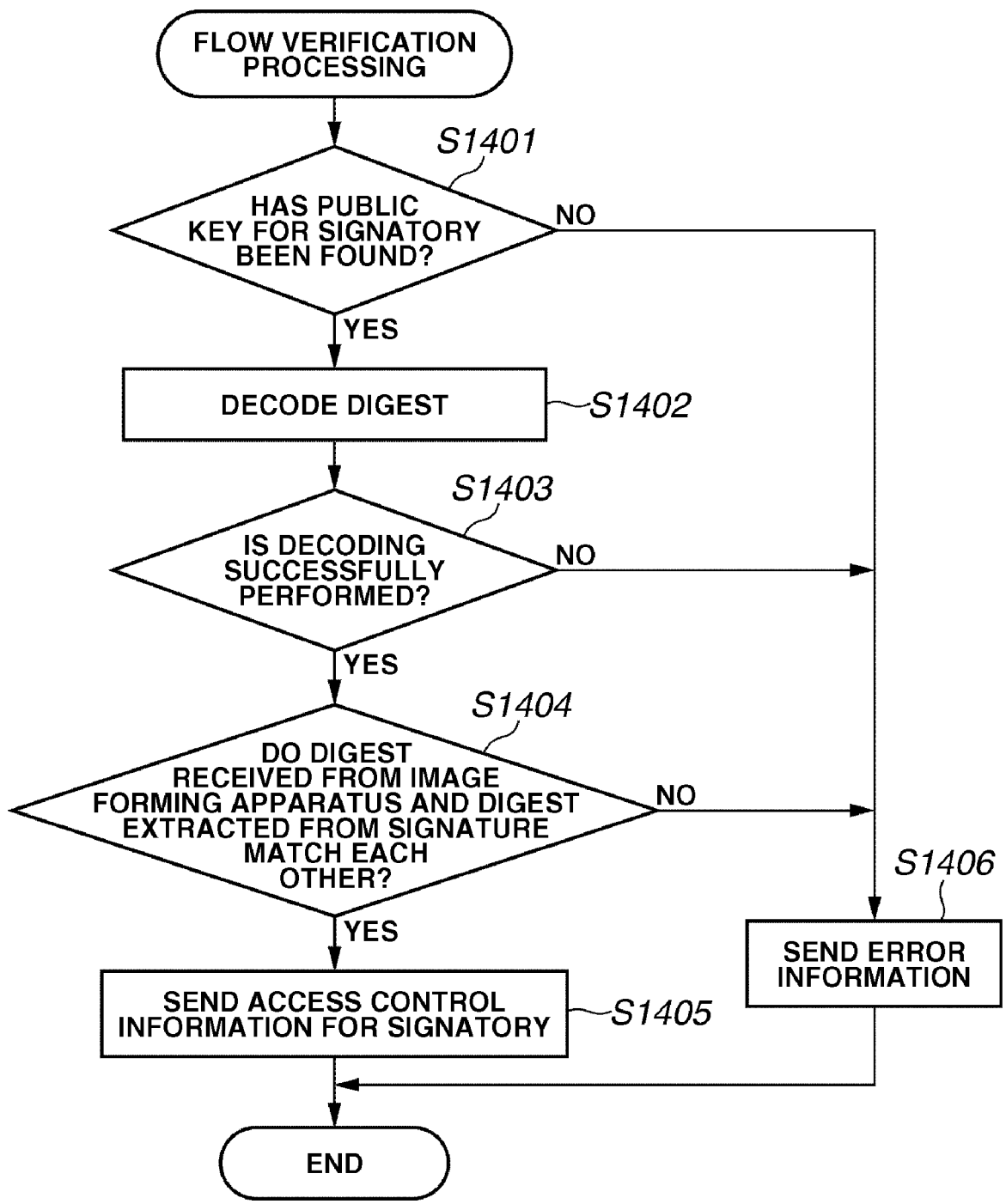
FIG. 14 is a flow chart illustrating an exemplary flow of processing for verifying a flow according to the second exemplary embodiment of the present invention.

FIG. 14 is a flow chart illustrating processing performed with the CPU 301 of the server 130 according to a program for verifying a flow, according to the present exemplary embodiment.

Referring to FIG. 14, in step S1401, the flow-verification unit 702 searches, from among the public keys managed by the public-key management unit 705, a public key for the user having provided the flow with a signature received from the image-forming apparatus 110 via the communication unit 701. If the flow-verification unit 702 finds the public key for the user having provided the flow with the signature (YES in step S1401), then the CPU 301 advances to step S1402. On the other hand, if the flow-verification unit 702 does not find the public key for the user having provided the flow with the signature (NO in step S1401), then the CPU 301 advances to step S1406.

In step S1402, the flow-verification unit 702 extracts a digest of the flow from the signature. The flow-verification unit 702 decodes the signature using the public key found in step S1401 to extract the digest.

A private key for verifying the flow can be known only by a user who has generated the public flow. In addition, since encryption has been performed with the private key, if the signature is not successfully decoded, the flow can be determined as not being an authenticated flow. On the other hand, if the signature has been successfully decoded, it can be determined that the flow has been generated by the signatory. In this case, the flow is determined to be authentic.

In step S1403, the CPU 301 of the server 130 determines whether the signature has been successfully decoded in step S1402. If it is determined in step S1403 that the signature has been successfully decoded (YES in step S1403), then the CPU 301 advances to step S1404. On the other hand, if it is determined in step S1403 that the signature has not been successfully decoded (NO in step S1403), then the CPU 301 advances to step S1406.

In step S1404, the CPU 301 collates the digest received from the image-forming apparatus 110 with the digest extracted from the signature in step S1402 to determine whether they match each other. If it is determined in step S1404 that the digest received from the image-forming apparatus 110 and the digest extracted from the signature in step S1402 match each other (YES in step S1404), then the CPU 301 determines that no alteration has been performed on the flow and advances to step S1405. On the other hand, if it is determined in step S1404 that the digest received from the image-forming apparatus 110 and the digest extracted from the signature in step S1402 do not match each other (NO in step S1404), then the CPU 301 advances to step S1406.

In step S1405, the CPU 301 acquires from the authority-list management unit 704 access-control information for the user having provided the signature to the flow and sends the acquired access-control information to the image-forming apparatus 110. Then, the CPU 301 ends the processing.

In step S1406, the flow-verification unit 702 sends error information to the image-forming apparatus 110, and then the CPU 301 ends the processing.

With the above-described series of operations, the server 130 can verify the signature and the digest sent from the image-forming apparatus 110 and send the access-control information for the user having provided the flow with the signature to the image-forming apparatus 110.

According to the above-described present exemplary embodiment, under a management system environment in which performance of the function of the image-forming apparatus 110 is controlled, an administrator of the system can flexibly provide a user with an authority to perform a flow in the case where the user desires to perform a specific flow. More specifically, under a management system environment in which the function of the image-forming apparatus 110 is restricted for a user, a user (e.g., an administrator of the system) can allow another user to perform a flow under the authority of the user, not under the authority of another user. Thus, an operation convenient in the case where the operations are performed in a predetermined routine order and have a predetermined setting content is previously registered as a flow having a signature. Accordingly, a user can enable another user to perform a convenient flow.

In addition, according to the present exemplary embodiment, it is not necessary for a system administrator to exceptionally permit each job with respect to flows convenient when performed in a predetermined routine order and having a predetermined setting content.

Third Exemplary Embodiment

Now, a third exemplary embodiment of the present invention will be described below. In the third exemplary embodiment of the present invention, access-control information includes an authority for performing a flow.

A system (hardware) configuration and a software configuration of the third exemplary embodiment are similar to those in the first exemplary embodiment. A structure of the flow-setting file differs from that in the first exemplary embodiment.

Figure 15:
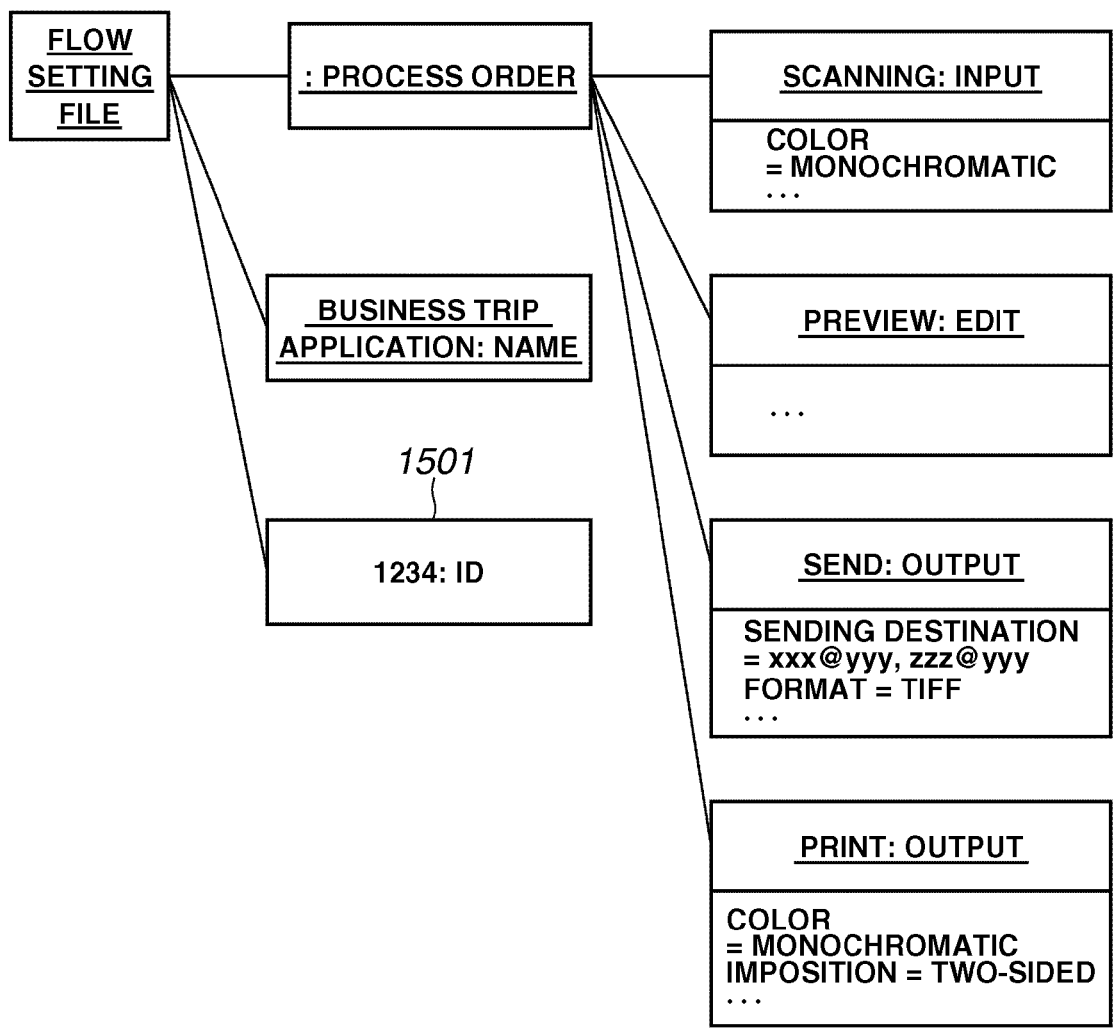
FIG. 15 illustrates an exemplary flow-setting file according to a third exemplary embodiment of the present invention.

FIG. 15 illustrates an exemplary flow-setting file according to the third exemplary embodiment of the present invention. The example illustrated in FIG. 15 differs from the example illustrated in FIG. 5 in a point that in the example in FIG. 5, an attribute 1501 indicating a flow identification (ID) for identifying a flow is used.

The flow ID is information for identifying a flow and is differently set for each flow. The server 130 and the image-forming apparatus 110 refer to the flow ID to identify a flow.

Now, an exemplary structure of the access-control information according to the present exemplary embodiment will be described below with reference to FIG. 16. FIG. 16 illustrates exemplary access-control information according to the present exemplary embodiment of the present invention.

The example illustrated in FIG. 16 differs from the example illustrated in FIG. 6 in that a flow ID is managed in addition to a setting for controlling the function for each image-forming processing. Referring to FIG. 16, the access-control information includes a flow ID list 1601 indicating a list of flows permitted to be performed by each user.

Here, it is supposed that a system administrator has previously set a flow ID for a flow to be authorized for each user to perform.

When a user has successfully logged into the image-forming apparatus 110 in the system according to the present exemplary embodiment, the CPU 201 of the image-forming apparatus 110 performs processing similar to the processing in the first exemplary embodiment (FIG. 8). Then, the server 130 transfers the access-control information including the flow ID for the permitted flow to the image-forming apparatus 110.

Now, processing for performing a flow according to the present exemplary embodiment will be described below with reference to FIG. 17.

Figure 17:
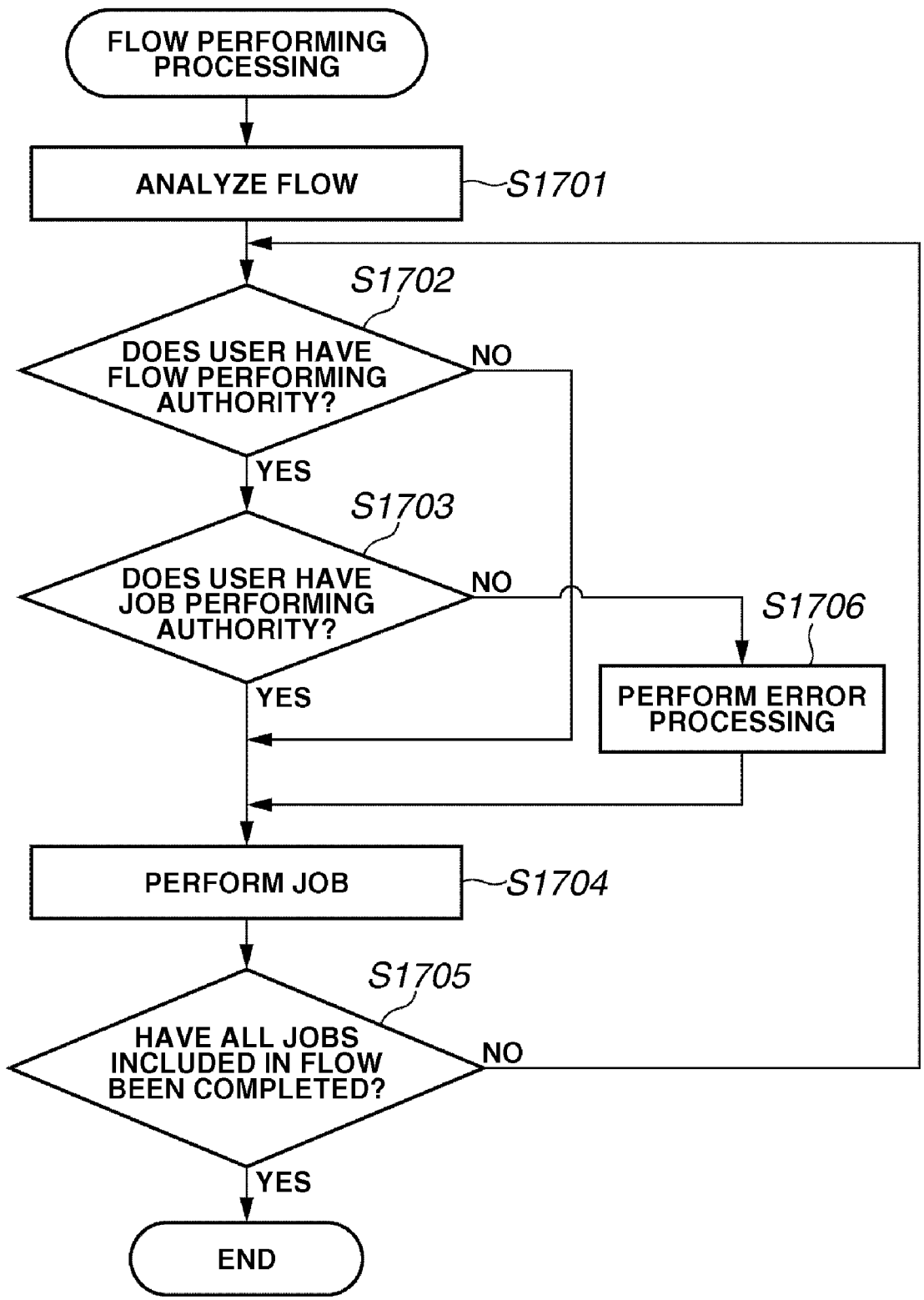
FIG. 17 is a flow chart illustrating an exemplary flow of processing for performing a flow according to the third exemplary embodiment of the present invention.

FIG. 17 is a flow chart illustrating processing performed based on a program for performing a flow with the CPU 201 of the image-forming apparatus 110 according to the present exemplary embodiment.

Referring to FIG. 17, in step S1701, the CPU 201 analyzes the flow to be performed with the flow-performing unit 406 to divide the flow to be performed in units of jobs. The flow-performing unit 406 sets the job defined in the flow-setting file to the job-list management unit 410 according to the predetermined processing order.

In setting a job to the job-list management unit 410, the job is associated with information indicating in which flow the job has been included. Then, the flow-performing unit 406 generates an instruction to the job-performing unit 407 for performing the job included in the flow according to the predetermined processing order.

In step S1702, the job-performing unit 407 checks whether the user has an authority to perform the flow to be performed. At this time, the CPU 201 reads from a flow definition file the flow ID for the flow to be performed to check whether the flow ID is included in the access-control information for the log-in user.

If it is determined in step S1402 that the access-control information includes the flow ID read from the flow definition file (YES in step S1702), then the CPU 201 ignores other access-control information and determines that the log-in user has an authority to perform the flow, and then advances to step S1704. On the other hand, if it is determined in step S702 that the access-control information does not include the flow ID read from the flow definition file (NO in step S1702), then the CPU 201 advances to step S1703.

In step S1703, the job-performing unit 407 checks whether the log-in user has an authority to perform the job to be performed. That is, the job-performing unit 407 determines whether the log-in user can perform the job with the job setting according to the access-control information. The job-performing unit 407 collates the setting for the job to be performed with the access-control information for the log-in user described in the authority list.

If it is determined in step S1703 that the log-in user cannot perform the job with the job setting according to the access-control information (NO in step S1703), then the CPU 201 advances to step S1706. On the other hand, if it is determined in step S1703 that the log-in user can perform the job with the job setting according to the access-control information (YES in step S1703), then the CPU 201 advances to step S1704.

The processing in step S1706 is performed when it is determined that the job cannot be performed according to the setting as a result of collation of the job setting and the access-control information. That is, in step S1706, error processing is performed. In this case, in step S1706, the CPU 201 modifies the job setting to a job setting not restricted by the access-control information and with which the job can be performed. Then, the CPU 201 advances to step S1704.

Here, whether the job setting is to be modified and whether the user performs the job with the modified job setting can be selected by the user via the operation unit 111. If the user selects not to perform the job, the CPU 201 suspends performing the job.

In the case of canceling the job, the subsequent flows cannot be performed. In this case, the CPU 201 deletes jobs of the flow to be performed from the job-list management unit 410.

In step S1704, the CPU 201 performs the job included in the flow to be performed.

In step S1705, the CPU 201 determines whether all of the jobs included in the flow to be performed have been already performed.

If it is determined in step S1705 that all of the jobs included in the flow to be performed have been already performed (YES in step S1705), then the CPU 201 ends the processing for performing the flow. On the other hand, if it is determined in step S1705 that all of the jobs included in the flow to be performed have not been performed yet (NO in step S1705), then the CPU 201 advances to step S1702 to perform the next job included in the flow to be performed.

According to the above-described present exemplary embodiment, under a management system environment in which performance of the function of the image-forming apparatus 110 is controlled, an administrator of the system can flexibly provide a user with an authority to perform a flow in the case where the user desires to perform a specific flow.

More specifically, an administrator of the system can provide a user with an authority to perform a flow having the flow ID included in the access-control information for the user. Thus, the user can perform the flow using a flow ID including setting information indicating an authority to perform the job.

In the present exemplary embodiment, an identifier such as the flow ID 1501 is used as the flow identification information. However, the present exemplary embodiment is not limited to this. That is, a hash value for the portion to be processed of the flow can be used instead of the flow ID.

In this case, the access-control information can previously include hash values for the flow to be permitted to be performed. In step S1702 (FIG. 17), the CPU 201 collates the hash value for the flow to be performed with the hash value for the flow that the log-in user has been authorized to perform. Thus, the CPU 201 can determine whether the log-in user has an authority to perform the flow. With this configuration, it is useful that the flow-setting file is difficult to alter.

Other Exemplary Embodiments

In addition, the present invention can be applied to a system including a plurality of devices (e.g., a computer, an interface device, a reader, a printer, and a file server) and to an apparatus that includes one device (e.g., a multifunction peripheral, a printer, and a facsimile apparatus).

Furthermore, the present invention can also be achieved by providing a system or a device with a storage medium (or a recording medium) which stores program code of software implementing the functions of the embodiments and by reading and executing the program code stored in the storage medium with a computer of the system or the device (a CPU or a micro processing unit (MPU)).

In this case, the program code itself, which is read from the storage medium, implements the functions of the embodiments mentioned above, and accordingly, the storage medium storing the program code embodies the present invention.

In addition, the functions according to the embodiments described above can be implemented not only by executing the program code read by the computer, but also implemented by the processing in which an operating system (OS) or the like carries out a part of or the whole of the actual processing based on an instruction given by the program code.

As the recording medium for supplying such program code, a floppy disk, a hard disk, an optical disk, a magneto-optical disk (MO), a compact disk read-only memory (CD-ROM), a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application NO. 2006-227987 filed Aug. 24, 2006, which is hereby incorporated by reference herein in its entirety.

What is claimed is:

1. An image-forming apparatus including a storage unit and at least any one of a network connection unit, a printer unit, and a scanner unit, a function provided by using a configuration of the image-forming apparatus being performed or controlled based on access-control information, the image-forming apparatus being capable of performing a flow based on flow setting information which designates an order of performance of a plurality of functions provided by the image-forming apparatus, the image-forming apparatus comprising:

an acquisition unit configured to acquire access-control information for a user who has provided a signature to the flow setting information when the flow setting information stored in the storage unit includes the signature; and a flow-performing unit configured to perform the flow based on the access-control information acquired by the acquisition unit, wherein, when validity of the flow is not verified based on the signature included in the flow setting information, the acquisition unit acquires the access-control information of the user who has provided instructions to perform the flow, and the flow is performed based on the access-control information.

2. The image-forming apparatus according to claim 1, further comprising:

a display unit configured to display a user interface screen to provide instructions to perform the flow, wherein a flow based on flow setting information including a signature and a flow based on flow setting information not including a signature are displayed such that the respective flows can be identified.

3. An image-forming apparatus including a storage unit and at least any one of a network connection unit, a printer unit, and a scanner unit, a function provided by using a configuration of the image-forming apparatus being performed or controlled based on access-control information, the image-forming apparatus being capable of performing a flow based on flow setting information which designates an order of performance of a plurality of functions provided by the image-forming apparatus, the image-forming apparatus comprising:

an acquisition unit configured to acquire the access-control information including designation information to designate flow-identification information to identify the flow;

a determination unit configured to determine whether flow setting information that is used for performing a target flow and that is stored in the storage unit includes the flow-identification information designated by the designation information included in the access-control information; and a flow-performing unit configured to perform the flow based on the access-control information when the determination unit determines that the flow setting information includes the flow-identification information designated by the designation information included in the access-control information, wherein, when validity of the flow is not verified based on the flow-identification information designated by the designation information included in the flow-setting information, the acquisition unit acquires the access-control information of a user who has provided instructions to perform the flow, and the flow is performed based on the access-control information.

4. An information processing method executed in an image-forming apparatus including a storage unit and at least any one of a network connection unit, a printer unit, and a scanner unit, a function provided by using a configuration of the image-forming apparatus being performed or controlled based on access-control information, the image-forming apparatus being capable of performing a flow based on flow setting information which designates an order of performance of a plurality of functions provided by the image-forming apparatus, the information processing method comprising the steps of:

acquiring access-control information for a user who has provided a signature to the flow setting information when the flow setting information stored in the storage unit includes the signature; and performing the flow based on the acquired access-control information, wherein, when validity of the flow is not verified based on the signature included in the flow setting information, the access-control information of the user who has provided instructions to perform the flow is acquired, and the flow is performed based on the access-control information.

5. The information processing method according to claim 4, further comprising the step of:

displaying a user interface screen to provide instructions to perform the flow, wherein a flow based on flow setting information including a signature and a flow based on flow setting information not including a signature are displayed such that the respective flows can be identified.

6. An information processing method executed in an image-forming apparatus including a storage unit and at least any one of a network connection unit, a printer unit, and a scanner unit, a function provided by using a configuration of the image-forming apparatus being performed or controlled based on access-control information, the image-forming apparatus being capable of performing a flow based on flow setting information which designates an order of performance of a plurality of functions provided by the image-forming apparatus, the information processing method comprising the steps of:

acquiring the access-control information including designation information to designate flow-identification information to identify the flow;

determining whether flow setting information that is used for performing a target flow and that is stored in the storage unit includes the flow-identification information designated by the designation information included in the access-control information; and performing the flow based on the access-control information when the determination step determines that the flow setting information includes the flow-identification information designated by the designation information included in the access-control information, wherein, when validity of the flow is not verified based on the flow-identification information designated by the designation information included in the flow-setting information, the access-control information of a user who has provided instructions to perform the flow is acquired, and the flow is performed based on the access-control information.

7. A computer storage medium on which is stored a computer program for making a computer execute a information processing method for performing a flow based on flow setting information which designates an order of performance of a plurality of functions provided by an image-forming apparatus, wherein the image-forming apparatus includes a storage unit and at least any one of a network connection unit, a printer unit, and a scanner unit, and wherein a function provided by using a configuration of the image-forming apparatus is performed or controlled based on access-control information, the method comprising the steps of:

acquiring access-control information for a user who has provided a signature to the flow setting information when the flow setting information stored in the storage unit includes the signature; and performing the flow based on the acquired access-control information, wherein, when validity of the flow is not verified based on the signature included in the flow setting information, the access-control information of the user who has provided instructions to perform the flow is acquired, and the flow is performed based on the access-control information.

8. A computer storage medium on which is stored a computer program for making a computer execute a information processing method for performing a flow based on flow setting information which designates an order of performance of a plurality of functions provided by an image-forming apparatus, wherein the image-forming apparatus includes a storage unit and at least any one of a network connection unit, a printer unit, and a scanner unit and wherein a function provided by using a configuration of the image-forming apparatus is performed or controlled based on access-control information, the method comprising the steps of:

acquiring the access-control information including designation information to designate flow-identification information to identify the flow;

determining whether flow setting information that is used for performing a target flow and that is stored in the storage unit includes the flow-identification information designated by the designation information included in the access-control information; and performing the flow based on the access-control information when the determination step determines that the flow setting information includes the flow-identification information designated by the designation information included in the access-control information, wherein, when validity of the flow is not verified based on the flow-identification information designated by the designation information included in the flow-setting information, the access-control information of a user who has provided instructions to perform the flow is acquired, and the flow is performed based on the access-control information.

9. An authority control server to generate access-control information to perform or control a function provided by using a configuration of an image forming apparatus, the image forming apparatus including a network connection unit and at least any one of a printer unit and a scanner unit, the authority control server comprising:

a generation unit configured to generate access-control information for a user who has provided a signature to flow setting information which designates an order of performance of a plurality of functions of the image-forming apparatus;

a sending unit configured to send the access-control information generated by the generation unit to the image-forming apparatus via the network connection unit; and a verification unit configured to verify validity of the flow based on the signature included in the flow setting information, wherein the generation unit generates access-control information for the user who has provided the signature to the flow setting information when the validity of the flow is verified by the verification unit.

10. An information processing method executed in an authority control server to generate access-control information to perform or control a function provided by using a configuration of an image forming apparatus including a network connection unit and at least any one of a printer unit and a scanner unit, the information processing method comprising the steps of:

generating access-control information for a user who has provided a signature to flow setting information which designates an order of performance of a plurality of functions of the image-forming apparatus; and sending the generated access-control information to the image-forming apparatus via the network connection unit; and verifying validity of the flow based on the signature included in the flow setting information, wherein access-control information for the user who has provided the signature to the flow setting information is generated when the validity of the flow is verified.

11. An image-forming apparatus including a storage unit and at least any one of a network connection unit, a printer unit, and a scanner unit, a function provided by using a configuration of the image-forming apparatus being performed or controlled based on access-control information, the image-forming apparatus being capable of performing a flow based on flow setting information which designates an order of performance of a plurality of functions provided by the image-forming apparatus, the image-forming apparatus comprising:

a determination unit configured to determine whether the flow setting information stored in the storage unit includes a signature;

an acquisition unit configured to acquire, when the determination unit determines that the flow setting information includes the signature, access-control information for a user who has provided the signature to the flow setting information and to acquire, when the determination unit determines that the flow setting information does not include the signature, access-control information of a user who has provided instructions to perform the flow; and a flow-performing unit configured to perform the flow based on the access-control information acquired by the acquisition unit.

12. An information processing method executed in an image-forming apparatus including a storage unit and at least any one of a network connection unit, a printer unit, and a scanner unit, a function provided by using a configuration of the image-forming apparatus being performed or controlled based on access-control information, the image-forming apparatus being capable of performing a flow based on flow setting information which designates an order of performance of a plurality of functions provided by the image-forming apparatus, the information processing method comprising the steps of:

determining whether the flow setting information stored in the storage unit includes a signature, acquiring access-control information for a user who has provided the signature to the flow setting information when it is determined that the flow setting information includes the signature;

acquiring access-control information of a user who has provided instructions to perform the flow when it is determined that the flow setting information does not include the signature; and performing the flow based on the acquired access-control information.

* * * * *